United States Patent
Yoshida et al.

(10) Patent No.: US 7,150,934 B2
(45) Date of Patent: Dec. 19, 2006

(54) ELECTROLYTE FILM ELECTRODE UNION, FUEL CELL CONTAINING THE SAME AND PROCESS FOR PRODUCING THEM

(75) Inventors: Akihiko Yoshida, Hirakata (JP); Yoshihiro Hori, Ikoma (JP); Makoto Uchida, Hirakata (JP); Eiichi Yasumoto, Soraku-gun (JP); Yasuo Takebe, Uji (JP); Osamu Sakai, Moriguchi (JP); Shinya Kosako, Kobe (JP); Takeshi Yonamine, Mino (JP); Masaki Yamauchi, Hirakata (JP); Yasushi Sugawara, Higashiosaka (JP); Junji Morita, Moriguchi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/508,971

(22) PCT Filed: Mar. 25, 2003

(86) PCT No.: PCT/JP03/03662

§ 371 (c)(1),
(2), (4) Date: Nov. 10, 2004

(87) PCT Pub. No.: WO03/081700

PCT Pub. Date: Oct. 2, 2003

(65) Prior Publication Data

US 2005/0142430 A1 Jun. 30, 2005

(30) Foreign Application Priority Data

Mar. 26, 2002 (JP) .............................. 2002-085273
Mar. 26, 2002 (JP) .............................. 2002-085279

(51) Int. Cl.
*H01M 4/00* (2006.01)

(52) U.S. Cl. .......................................... 429/44; 429/40
(58) Field of Classification Search .................. 429/40, 429/44
See application file for complete search history.

(56) References Cited

U.S. PATENT DOCUMENTS 6,127,059 A 10/2000 Kato (Continued)

FOREIGN PATENT DOCUMENTS

EP 0869568 10/1998

(Continued)

*Primary Examiner*—Patrick Joseph Ryan
*Assistant Examiner*—Ben Lewis
(74) *Attorney, Agent, or Firm*—Stevens, Davis, Miller & Mosher, LLP

(57) ABSTRACT

By using a gas diffusion layer for a fuel cell comprising a fabric comprising a warp thread and a weft thread which are made of carbon fiber, wherein the distance X between adjacent intersections where the warp and weft threads cross each other and the thickness Y of the fabric satisfy the equation: $1.4 \leq X/Y \leq 3.5$, the present invention reduces the surface asperities of the substrate and prevents a micro short-circuit resulting from the piercing of the polymer electrolyte membrane of the fuel cell by the carbon fibers of the fabric so as to improve the characteristics of the fuel cell.

In order to further prevent the piercing of the polymer electrolyte membrane by the carbon fibers of the gas diffusion layer substrate, the rough surface of the carbon fabric is smoothed by: (1) applying a clamping pressure of 1 to 20 kgf/cm² to the contact area between each electrode and each conductive separator plate of the fuel cell; or (2) heating the gas diffusion layer surface before the gas diffusion layer is disposed onto the polymer electrolyte membrane.

6 Claims, 10 Drawing Sheets

U.S. PATENT DOCUMENTS

| | | |
|---|---|---|
| 6,641,862 B1 * 11/2003 | Grot | 427/115 |
| 6,818,339 B1 * 11/2004 | Sugawara et al. | 429/30 |
| 2001/0046600 A1 11/2001 | Hsiao et al. | |
| 2002/0045089 A1 * 4/2002 | Kawahara et al. | 429/44 |
| 2002/0160252 A1 * 10/2002 | Hirahara et al. | 429/44 |
| 2003/0022055 A1 * 1/2003 | Menashi | 429/44 |

FOREIGN PATENT DOCUMENTS

| | | |
|---|---|---|
| EP | 1445811 | 8/2004 |
| JP | 08124583 | 5/1996 |
| JP | 10261421 | 9/1998 |
| JP | 2001085019 | 3/2001 |
| JP | 2001345108 | 12/2001 |
| JP | 2002327355 | 11/2002 |
| JP | 2002348743 | 12/2002 |
| JP | 2003045443 | 2/2003 |
| JP | 2003109616 | 4/2003 |
| WO | 0208150 | 1/2002 |
| WO | 0242534 | 5/2002 |

* cited by examiner

ELECTROLYTE FILM ELECTRODE UNION, FUEL CELL CONTAINING THE SAME AND PROCESS FOR PRODUCING THEM

TECHNICAL FIELD

The present invention relates to: an electrolyte membrane-electrode assembly for a polymer electrolyte fuel cell useful as consumer co-generation systems and mobile power-generating appliances, which directly uses, as a fuel, pure hydrogen, reformed hydrogen obtained from methanol or fossil fuels, or a liquid fuel such as methanol, ethanol and dimethyl ether, and, as an oxidant, air or oxygen; a fuel cell using the same; and a production method thereof.

BACKGROUND ART

A polymer electrolyte fuel cell simultaneously generates electricity and heat by electrochemically reacting a fuel gas such as hydrogen and an oxidant gas such as air in a gas diffusion electrode having a catalyst layer such as platinum with use of a polymer electrolyte membrane, which selectively transfers hydrogen ions, as an electrolyte.

A catalytic reaction layer mainly composed of a carbon powder carrying a platinum group metal catalyst and a polymer electrolyte covering the carbon powder is tightly attached to both surfaces of the polymer electrolyte membrane. On the outer face of the catalyst layers is tightly attached a pair of gas diffusion layers having gas permeability and electroconductivity. The gas diffusion layer and the catalytic reaction layer constitute a gas diffusion electrode. On the outer face of the gas diffusion electrode is disposed a conductive separator plate for mechanically fastening an electrode electrolyte membrane assembly comprising the polymer electrolyte membrane and the gas diffusion layer (hereinafter referred to as "MEA"), and at the same time for electrically interconnecting adjacent MEAs in series. The conductive separator plate has gas channels for supplying a reactant gas to the electrodes, and for conveying a surplus gas and water generated by a reaction. Although the gas channels may be arranged separately from the separator plate, grooves are usually formed on the surface of the separator plate to serve as gas channels.

On the other face of the separator plate are provided cooling channels for circulating cooling water so as to maintain the cell temperature constant. Due to the circulation of cooling water, a thermal energy generated by a reaction can be used in the form of hot water or the like. In order to supply and discharge such reactant gas and cooling water, channels called manifolds are provided.

Gaskets with sealing capability are arranged on the periphery of the electrodes to prevent gas leakage to the counter electrode or to the outside. Typically, an end plate is arranged at each end of a stack, in which a plurality of unit cells are stacked in one direction, and the two end plates are fixed with a clamping member in order to permanently clamp the whole stack.

The gas diffusion electrode of this type of fuel cell mainly has three functions described below. The first function is to diffuse the reactant gas to uniformly supply the fuel gas or oxidant gas from gas channels formed on the outer face of the gas diffusion layer to a catalyst within the catalyst layer. The second function is to rapidly discharge water produced by a reaction in the catalyst layer to the gas channels. The third function is to conduct electrons required or produced by a reaction.

Accordingly, the gas diffusion layer is required to have high gas permeability, high water discharge capability and high electronical conductivity. As a conventional technique for imparting gas permeability, the substrate for gas diffusion layer is designed to have a porous structure. For imparting water discharge capability, a water repellent polymer such as fluorocarbon resin is dispersed within the gas diffusion layer, thereby preventing water clogging (flooding). For imparting electronical conductivity, the gas diffusion layer is made using an electronically conductive material such as carbon fiber, metal fiber and carbon fine powder.

There are mainly three types of gas diffusion layers currently in use. One is what is called carbon paper. The second is what is called carbon cloth (fabric). The third is what is called carbon felt (non-woven fabric).

Carbon paper is carbon fibers made into the form of a sheet and has proper rigidity. It is usually used in a fuel cell whose stack is clamped with a predetermined clamping pressure because the substrate does not fall down into the gas channels of the separator plate and it is easy to be designed due to low pressure-loss. It is, however, difficult to control porosity, and flooding is likely to occur because carbon fibers are randomly oriented. Moreover, since carbon paper is in the form of a sheet, it is difficult to form it into a roll and its continuous production is also difficult, facing the challenge of reducing production cost.

As for carbon cloth, since the fibers are oriented in a particular direction, it is relatively easy to control porosity. Accordingly, flooding is unlikely to occur during the supply of highly humidified reactant gas in the operation. Furthermore, since carbon cloth is a fabric, it is flexible and therefore continuous production can be achieved, thus offering an advantage in terms of production cost. Carbon felt is considered to be promising because its production cost is obviously the lowest. It has, however, the problem of reliability at present, and a rapid improvement in reliability is now expected to be made. In view of these points, carbon cloth is currently superior in terms of reliability, mass productivity and performance in a high humidity environment.

The use of carbon cloth as the substrate for gas diffusion layer for fuel cell has the above-described advantages; at the same time, it has many disadvantages. Since carbon cloth is a fabric, it has concave and convex portions in the thickness direction on the surface thereof, which are unavoidable. In a polymer electrolyte fuel cell intended to be thin in order to achieve higher performance, the carbon fibers of carbon cloth pierce the polymer electrolyte membrane to generate a micro short-circuit, thereby causing the lowering of voltage. Further, this micro short-circuit causes hydrogen and oxygen to react with each other in an electrode to cause a combustion reaction, which also lowers reliability due to the degradation of polymer electrolyte membrane.

To cope with these problems, in a technique described in one prior art, Japanese Laid-Open Patent Publication No. Hei 10-261421, when a water repellent layer is formed on a carbon cloth, the carbon cloth is impregnated with a part of the water repellent layer from the surface of the carbon cloth and into the carbon cloth. It is not allowed to impregnate the whole carbon cloth with the water repellent layer. In other words, it is a technique for smoothing the concave and convex portions of the carbon cloth by the water repellent layer on the surface of the carbon cloth. This prior art reference, however, does not teach the technical idea of preventing the micro short-circuit as described above.

Moreover, another prior art, Japanese Laid-Open Patent Publication No. 2001-85019, discloses a technique for preventing the micro short-circuit by forming a water repellent layer on the surface of a carbon cloth, which is then hot-pressed to smooth the concave and convex portions of the carbon cloth.

Any of these prior art references, however, does not cope with a carbon cloth material itself. In other words, the prior art references are intended, not to prevent the surface concave and convex portions of the carbon cloth per se, but to smooth the water repellent layer or to smooth the whole gas diffusion layer substrate including the water repellent layer. Accordingly, these prior art references have limits in smoothing or preventing the micro short-circuit, and the manufacturing process thereof is complicated, which makes the production cost higher.

Furthermore, the micro short-circuit results not only from the concave and convex portions but also from fuzz present on the gas diffusion substrate.

DISCLOSURE OF INVENTION

In order to solve these conventional problems, an object of the present invention is to provide an electrolyte membrane-electrode assembly (MEA) that can be used to produce a polymer electrolyte fuel cell with high reliability in which a micro short-circuit resulting from the piercing of a polymer electrolyte membrane by carbon fibers is prevented.

An MEA based on a first aspect of the present invention for achieving this purpose comprises a hydrogen ion conductive polymer electrolyte membrane and a pair of electrodes sandwiching the polymer electrolyte membrane therebetween, the electrode comprising a catalyst layer and a gas diffusion layer attached to the polymer electrolyte membrane, wherein the gas diffusion layer comprises a fabric comprising a warp thread and a weft thread which are made of carbon fiber, and the distance X between adjacent intersections where the warp and weft threads cross each other and the thickness Y of the fabric satisfy the equation:

$$1.4 \leq X/Y \leq 3.5.$$

According to the first aspect of the present invention, the distance X between adjacent intersections is 1.4 times or longer than the thickness Y of the fabric; therefore, it is possible to obtain the effect of reducing the concave and convex portions of the substrate surface. This prevents a micro short-circuit resulting from the piercing of the polymer electrolyte membrane by the carbon fibers of the fabric, eventually improving the performance of the fuel cell. If X is 3.5 times longer than Y, however, the electronical conductivity of the substrate serving as current collector will be lowered, leading to an undesirable voltage drop. Conversely, if X is less than 1.4 times longer than Y, the effect of reducing the concave and convex portions of the substrate surface cannot be expected.

In this first aspect, it is preferred that the height A and the width B of the warp thread, and the height C and the width D of the weft thread respectively satisfy $0.2 \leq A/B \leq 0.4$ and $0.1 \leq C/D \leq 0.4$. This requirement enables the warp and weft threads to form an ellipse oblong in the surface direction, achieving the effect of reducing the concave and convex portions of the substrate surface. This prevents the piercing of the polymer electrolyte membrane by the fibers. If each of the above ratios exceeds 0.4, however, the desired reduction effect diminishes and the distance between the warp threads or that between the weft threads is likely to be long enough to eventually cause a polarization in the current collection of the fuel cell. Conversely, if A/B is less than 0.2, the warp threads are excessively loosened, making it difficult to produce a fabric with sufficient strength. Moreover, if C/D is less than 0.1, threads are likely to be separated to make the fabric surface rough, thereby reducing the current collecting ability of the fuel cell. Further, the contact resistance between the fabric and the catalyst layer, that between the fabric and the separator plate, and the electric resistance in the fabric are likely to increase to reduce the cell voltage.

Furthermore, in a first aspect, it is preferable that the height C and the width D of the weft thread, which is placed vertically to the consecutive warp thread, satisfy $0.1 \leq C/D \leq 0.3$. By coarsely weaving weft threads which are not required to be as strong as warp threads which are required to be strong, typically in a hooped cloth, it is possible to reduce the surface concave and convex portions of whole surface of the substrate and thus to prevent the piercing of the polymer electrolyte membrane by the fibers.

Furthermore, in a first aspect, it is preferable that the substrate has a water repellent layer comprising a carbon fine powder and a water repellent resin on the surface on the catalyst layer side, and the water repellent layer has a thickness of 1 to 50 μm. The formation of a layer having conductivity and water repellency on the substrate surface has the effect of increasing the distance between the polymer electrolyte membrane and the substrate when the polymer electrolyte membrane and the electrode are attached. Since this makes it possible to prevent the fibers from appearing on the electrode surface, the piercing of the polymer electrolyte membrane by the fibers can be prevented. For the purpose of preventing the micro short-circuit, the thicker the water repellent layer is, the better the effect is. An excessively thick water repellent layer, however, results in increased resistance, leading to performance degradation. Accordingly, the thickness is preferably not more than 50 μm. Conversely, if the thickness is thinner than 1 μm, it is difficult to prevent the piercing of the polymer electrolyte membrane by the carbon fibers. In view of these points, a more preferred thickness range is from 20 μm to 30 μm.

Furthermore, in a first aspect, it is preferable that the polymer electrolyte membrane has a thickness of 9 to 50 μm. This has the effect of increasing the distance between the substrate on the positive electrode side and the substrate on the negative electrode side when the polymer electrolyte membrane and the electrode are attached. As a result, the performance degradation due to the micro short-circuit can be prevented If the thickness is more than 50 μm, however, the resistance to ion transfer increases to reduce ionic conductivity, leading to the lowering of the cell voltage. In addition, the use of such thick polymer electrolyte membrane is likely to increase the resistance to water diffusion, which affects the balance of water content in the polymer electrolyte membrane, thus making the membrane excessively wet or excessively dry. In order to prevent this, it is necessary to maintain the wetness of the polymer electrolyte membrane using a complicated control process during the operation of the fuel cell. Conversely, if the thickness is less than 9 μm, the effect of increasing the distance between the substrate on the positive electrode side and the substrate on the negative electrode side cannot be expected.

Furthermore, in a first aspect, it is preferable that the catalyst layer has a thickness of 1 to 30 μm. This has the effect of increasing the distance between the polymer electrolyte membrane and the substrate when the polymer electrolyte membrane and the electrode are attached and prevents the piercing of the polymer electrolyte membrane by the fibers. If the thickness is greater than 30 μm, however, the gas diffusibility decreases to reduce the cell voltage. In addition, the ionic conductivity decreases, leading to the lowering of the cell voltage. Conversely, if the thickness is less than 1 μm, the effect of increasing the distance between the polymer electrolyte membrane and the substrate cannot be expected.

A polymer electrolyte fuel cell based on a second aspect of the present invention comprises:

(1) an MEA based on the first aspect comprising a hydrogen ion conductive polymer electrolyte membrane and a pair of electrodes sandwiching the polymer electrolyte membrane therebetween, the electrode comprising a catalyst layer attached to the polymer electrolyte membrane and a gas diffusion layer, the gas diffusion layer comprising a fabric comprising a warp thread and a weft thread which are made of carbon fiber, the distance X between adjacent intersections where the warp and weft threads cross each other and the thickness Y of the fabric satisfying the equation:

$1.4 \leq X/Y \leq 3.5;$ (2) a pair of conductive separator plates having a gas channel on the face in contact with the gas diffusion layer of the electrolyte membrane-electrode assembly and sandwiching the electrolyte membrane-electrolyte assembly while contacting the gas diffusion layer of the electrolyte membrane-electrode assembly, wherein (3) a clamping pressure of 1 to 20 kgf/cm$^2$ is applied onto the contact area where each of the electrodes and each of the conductive separator plates are in contact with each other. By setting the clamping pressure to be 20 kgf/cm$^2$ or less, it is possible to prevent the piercing of the polymer electrolyte membrane by the fibers of the gas diffusion layer substrate. A clamping pressure of less than 1 kgf/cm$^2$, however, is not preferred because the contact resistance value excessively increases.

In a method for producing an MEA based on a third aspect of the present invention, when an MEA is produced by disposing a pair of electrodes comprising a catalyst layer and the gas diffusion layer on a hydrogen ion conductive polymer electrolyte membrane such that each of the catalyst layer is in contact with the polymer electrolyte membrane to sandwich the hydrogen ion conductive polymer electrolyte membrane between the pair of electrodes, the rough surface of the carbon fabric is smoothed by heating the surface of the gas diffusion layer before disposing the gas diffusion layer on the polymer electrolyte membrane. Preferred heating techniques include: flame radiation by, for example, a burner or the like; laser radiation; a radiant heater; etc. By previously carrying out the smoothing treatment of the surface of the gas diffusion layer, it is possible to oxidize the fuzz of carbon fiber and the random asperities to remove them without damaging the fiber skeleton of the carbon fiber, thus preventing the above-described micro short-circuit.

BRIEF DESCRIPTION OF DRAWINGS

FIG. 3A is a sectional view taken along a plane vertical to the longitudinal direction of a warp thread, and FIG. 3B is a sectional view taken along a plane vertical to the longitudinal direction of a weft thread.

FIG. 4A is a schematic sectional view taken along a plane vertical to the longitudinal direction of a warp thread, and FIG. 4B is a sectional view taken along a plane vertical to the longitudinal direction of a weft thread.

BEST MODE FOR CARRYING OUT THE INVENTION

First, an example of the basic structure of a unit cell of a polymer electrolyte fuel cell to be used in an embodiment of the present invention is described below referring to FIG. 1.

Figure 1:
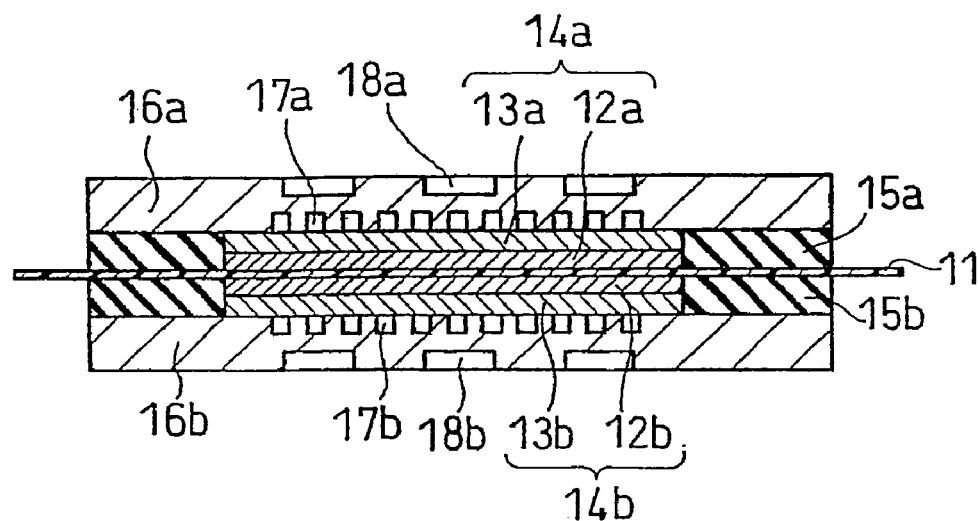
FIG. 1 is a schematic sectional view illustrating the basic structure of a polymer electrolyte fuel cell using an MEA in one embodiment of the present invention.

In FIG. 1, the reference numeral 11 represents a polymer electrolyte membrane which selectively transfers hydrogen ions. On both surfaces of the electrolyte membrane 11 are respectively tightly attached catalyst layers 12a and 12b mainly composed of a carbon powder carrying a platinum group metal catalyst with the use of a hot press or the like. On the outer faces of the catalyst layers 12a and 12b are attached a pair of gas diffusion layers 13a and 13b having both permeability and conductivity with the use of a hot press or the like. The combination of the gas diffusion layer 13a and the catalyst layer 12a, and that of the gas diffusion layer 13b and the catalyst layer 12b constitute a pair of electrodes 14a and 14b. On the outer faces of the electrodes 14a and 14b are positioned a pair of conductive separator plates 16a and 16b. The conductive separator plates 16a and 16b mechanically fasten an electrolyte membrane-electrode assembly (MEA) comprising the polymer electrolyte membrane 11 and the pair of electrodes 14a and 14b sandwiching the membrane, and at the same time electrically interconnect adjacent MEAs in series. The conductive separator plates 16a and 16b have gas channels 17a and 17b for supplying a reactant gas to the electrodes and conveying a surplus gas and a gas generated by a reaction on the side thereof that faces the electrode.

On the other sides of the separator plates 16a and 16b are formed cooling channels 18a and 18b for circulating cooling water to maintain the cell temperature constant. By circulating cooling water in this manner, it is possible to utilize a thermal energy generated by a reaction in the form of hot water or the like. Although not shown in the figure, channels called manifolds are necessary to supply a gas and cooling water from the outside, and eventually to discharge them to the outside. There is an external manifold, which can be arranged outside a cell stack. But so-called internal manifold is commonly used, in which an aperture for supplying a reactant gas, one for discharging a reactant gas, one for supplying cooling water and one for discharging cooling water are formed inside a cell stack, more specifically, apertures formed in a conductive separator plate and those formed in the other elements of the cell stack are connected in series to form manifold apertures.

Gaskets 15a and 15b with sealing function are arranged on the periphery of the electrodes 14a and 14b, in other words, on the periphery of the gas channels so as to prevent gas leakage to the counter electrode or to the outside. Likewise, gaskets are also disposed on the periphery of each manifold aperture and on the periphery of the cooling water channels. As the gasket, an O-ring, a rubber sheet, a composite sheet made of an elastic resin and a rigid resin and the like are used. In order to make an MEA easy to handle, a composite material gasket with a certain degree of rigidity is usually integrated into an MEA. It is to be noted that a polymer electrolyte fuel cell stack as described above is required to be constantly fastened so as to reduce the electrical contact resistance of elements such as a bipolar plate. In order to achieve this, it is effective to arrange both an insulating plate and an end plate at the top end as well as at the bottom end of a unit cell (or, in the case of a practical fuel cell, at the top end and the bottom end of a stack in which a plurality of unit cells are stacked in one direction), and then to apply a clamping pressure onto both end plates with the use of a clamping member for fixing. A preferred clamping method is to clamp the whole surface of the unit cell as uniformly as possible, that is, to apply a clamping force uniformly onto the whole surface of the unit cell. From the viewpoint of mechanical strength, a metal material such as stainless steel is typically used for the clamping member such as the end plate.

In the experiments of Examples described below, a conductive separator plate is additionally disposed to the top and bottom ends of the above-described unit cell, which is shown in FIG. 1. The added conductive separator plate and the shown conductive separator plate 16a, and the other added conductive separator plate and the shown conductive separator plate 16b are respectively combined to form cooling water units so that cooling water flows in the cooling channels 18a and 18b. Further, the gas channels 17a and 17b are designed to supply reactant gases, namely, a fuel gas and an oxidant gas. Further, in order to clamp the unit cell, rigid insulating plates are placed on the outer faces of the added conductive separator plates in the experiments, respectively. Then, a stack comprising the plurality of insulating plates and the plurality of conductive separator plates and the MEA is held by a pressing machine, and subsequently a pressure is applied to the unit cell (i.e. MEA) by the pressing machine. The term "pressure" used herein means the same as the clamping pressure to be applied using the above-described clamping member. Accordingly, it can also be expressed as "clamping pressure".

The required function of the gas diffusion layer of the fuel cell involves complete supplying of the reactant gas to the whole surface of the catalyst layer through the gas channels of the separator plate. The separator plate has gas channels comprising a plurality of parallel grooves extending from the gas inlet manifold aperture to the outlet manifold aperture thereron, and reactant gases flow in the gas channels. The gas diffusion layer is in contact with the rib portions (i.e. the portion between the grooves) of the separator, and an electric current is collected therefrom. Accordingly, the gas diffusion layer is required not to interrupt the flow of the reactant gas which flows along the grooves formed on the separator plate, and the portion of the gas diffusion layer which is in contact with the ribs of the separator plate is required to diffuse the reactant gas to the catalyst layer portion which is not in contact with the gas channels. For this reason, the balance between the gas diffusibility in the gas diffusion layer face direction and that in the direction vertical to the gas diffusion layer face direction is important.

As for the substrate for the gas diffusion layer, the larger the area in contact with the ribs is, the more advantageous it is because the contact resistance can be reduced. Accordingly, it is preferred that carbon cloth is loosely woven because it becomes flexible when a clamping pressure is applied onto the cell. As for the fiber bundle which constitutes the cloth, it is effective to form a fiber bundle by twisting fibers loosely because the cloth made of the thus-obtained bundle is flexible. The greater the number of fiber bundles is, the thicker the carbon cloth is. This may cause the reactant gas supposed to flow along the grooves of the separator plate to flow within the gas diffusion layer, thereby sometimes losing the effect of the separator in which grooves are arranged such that the gas extends into the whole electrode. Accordingly, the number of fiber bundles and the strength of the twist are preferably low, and the weaving is preferably loose, if the obtained carbon cloth is strong enough to withstand the tensile strength during mass production. It is preferred that the reactant gas flows along the gas channels of the separator, rather than it flows in the gas diffusion layer face direction, because the reactant gas ideally extends into the whole electrode. Therefore, the thinner the gas diffusion layer is, the more preferred it is if a certain amount of the reactant gas flows in the gas diffusion layer face direction. Further, the fiber diameter of the carbon cloth is preferably small.

It should be noted that, although the contact area between the ribs of the separator plate and the gas diffusion layer is mentioned above, the contact area can also be expressed as the contact area between the separator plate and the electrode because the gas diffusion layer is part of the electrode.

[I] Embodiment Whose Main Point is the Structure of Gas Diffusion Layer

In view of the above, the point of the present invention is that the gas diffusion layer comprises a fabric comprising a warp thread and a weft thread which are made of carbon fiber, and the distance X between adjacent intersections of the warp and weft threads and the thickness Y of the fabric satisfy the equation: $1.4 \leq X/Y \leq 3.5$. Further, it is preferred that the height A and the width B of the warp thread, and the height C and the width D of the weft thread respectively satisfy $0.2 \leq A/B \leq 0.4$ and $0.1 \leq C/D \leq 0.4$. These requirements are described below referring to FIGS. 2A, 2B, 2C, 3A, 3B, 4A and 4B.

Figure 2A:
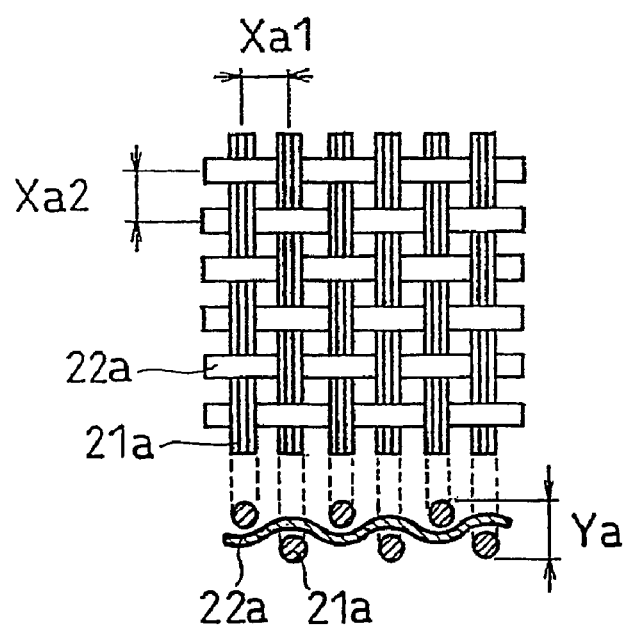
FIGS. 2A, 2B and 2C are plan views schematically illustrating, in cross section, a portion of the basic structure of fabrics (a plain weave fabric, a twill weave fabric and a sateen) which can be used for a gas diffusion layer for MEA in one embodiment of the present invention.
Figure 2B:
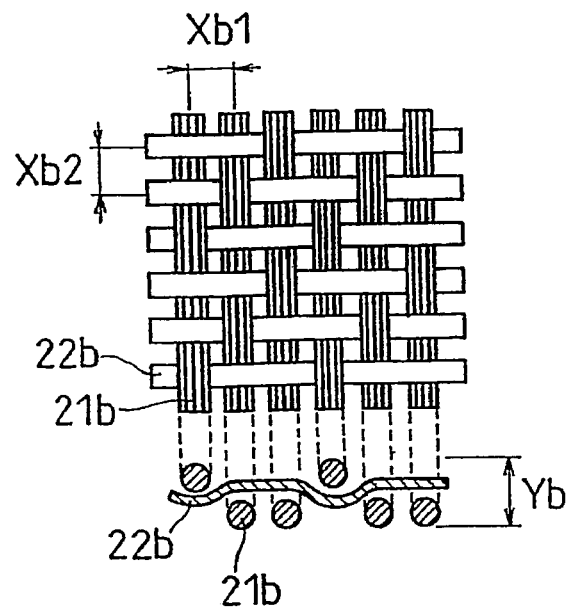
Figure 2C:
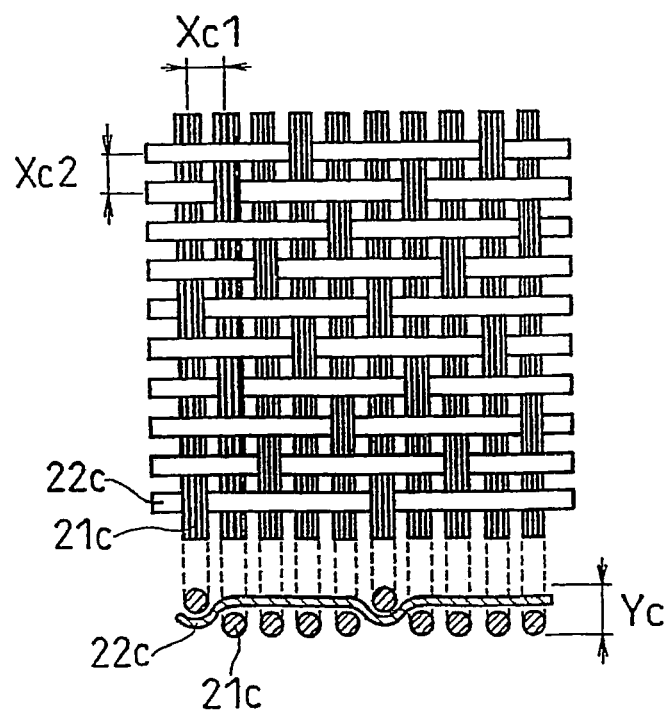

FIGS. 2A, 2B and 2C are plan views schematically illustrating, in cross section, a portion of the basic structure of fabrics (a plain weave fabric, a twill weave fabric and a sateen) which can be used for the gas diffusion layer of MEA in this embodiment.

In FIG. 2A, a plan view of a plain weave fabric comprising a warp thread 21a and a weft thread 22a is shown above, and a sectional view taken along a plane vertical to the longitudinal direction of the warp thread corresponding to the above plan view is shown below. As shown in the figure, the portion where the warp and weft threads cross each other is a substantially rectangular plane, and the intersection means the central point of the rectangular plane. As for the distance X between the adjacent intersections, the intersection distance between adjacent warp threads, that is, the intersection distance on the same weft thread is expressed as "Xa1", and the intersection distance between adjacent weft threads, that is, the intersection distance on the same warp thread is expressed as "Xa2" in FIG. 2A. The thickness of the fabric is expressed as "Ya".

Similarly, in FIG. 2B, a plan view of a twill weave fabric comprising a warp thread 21b and a weft threads 22b is shown above, and a sectional view taken along a plane vertical to the longitudinal direction of the warp thread corresponding to the above plan view is shown below. As shown in the figure, the portion where the warp and weft threads cross each other is a substantially rectangular plane, and the intersection means the central point of the rectangular plane. As for the distance X between the adjacent intersections, the intersection distance between adjacent warp threads, that is, the intersection distance on the same weft thread is expressed as "Xb1", and the intersection distance between adjacent weft threads, that is, the intersection distance on the same warp thread is expressed as "Xb2" in FIG. 2B. The thickness of the fabric is expressed as "Yb".

Likewise, in FIG. 2C, a plan view of a sateen comprising a warp thread 21c and a weft thread 22c is shown above, and a sectional view taken along a plane vertical to the longitudinal direction of the warp thread corresponding to the above plan view is shown below. As shown in the figure, the portion where the warp and weft threads cross each other is a substantially rectangular plane, and the intersection means the central point of the rectangular plane. As for the distance X between the adjacent intersection, the intersection distance between adjacent warp threads, that is, the intersection distance on the same weft thread is expressed as "Xc1", and the intersection distance between adjacent weft threads, that is, the intersection distance on the same warp thread is expressed as "Xc2". The thickness of the fabric is expressed as "Yc".

Although not apparent from the figures, each warp thread and each weft thread in FIGS. 2A, 2B and 2C are fiber bundles formed by twisting a plurality of thin fibers. In the cases of these figures, one bundle is used.

Figure 3A:
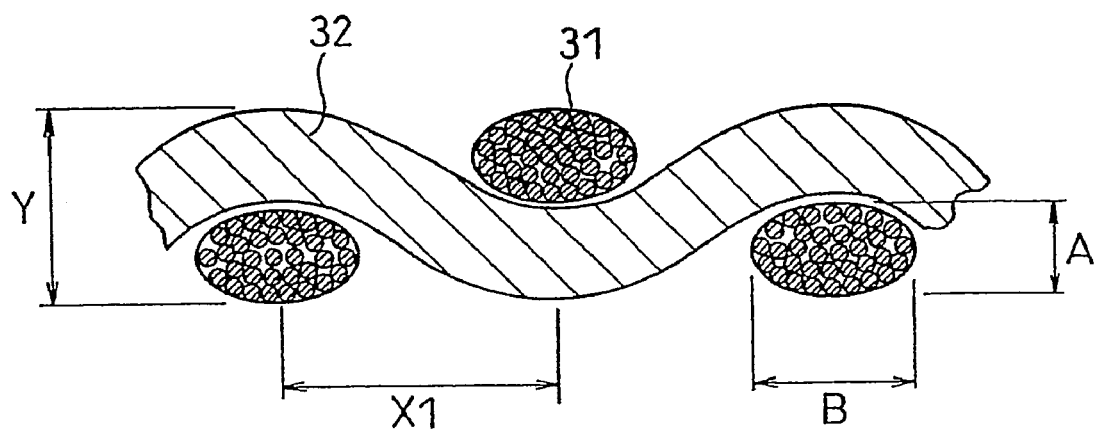
FIGS. 3A and 3B are enlarged views of a plain weave fabric which can be used for a gas diffusion layer for MEA. To be more specific.
Figure 3B:
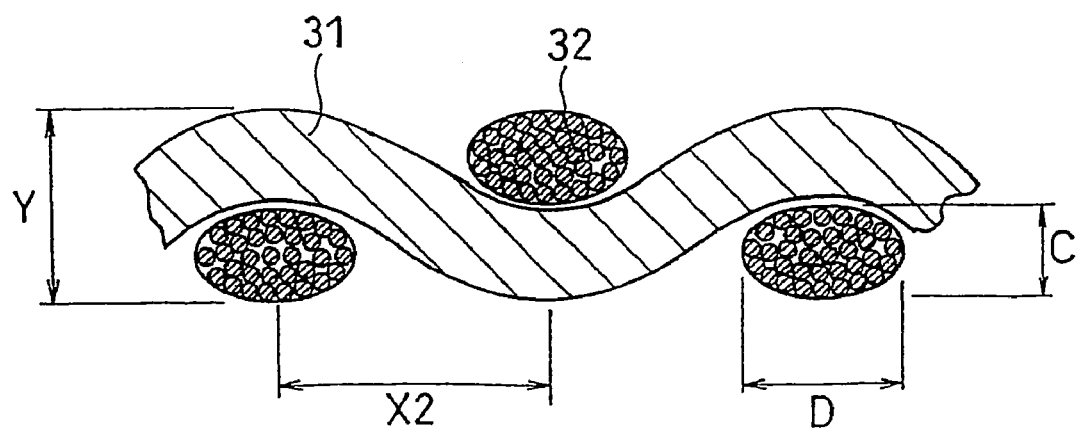

Next, FIGS. 3A and 3B are schematic sectional views of enlarged cross sections of a plain weave fabric which can be used for the gas diffusion layer for MEA in this embodiment. FIG. 3A is a sectional view taken along a plane vertical to the longitudinal direction of a warp thread, and FIG. 3B is a sectional view taken along a plane vertical to the longitudinal direction of a weft thread. Although FIGS. 3A and 3B are sectional views of a plain weave fabric comprising a warp thread 31 and a weft thread 32 similar to FIG. 2A, this is a diagram drawn to explain the intersection distance X which is one of featured points of the present invention, the thickness Y of the fabric, the height A and the width B of the warp thread, and the height C and the width D of the weft thread. It is to be noted that the warp thread 31 and the weft thread 32 are also respectively formed by twisting a plurality of thin fibers into one bundle.

As shown in the figures, the distance between the intersections, each of which is the central point of the portion where the warp thread 31 and the weft thread 32 cross each other, is referred to as "X1" between adjacent warp threads, and "X2" between adjacent weft threads. The intersection distances X1 and X2 may be identical or different. Either case is acceptable if the requirement $1.4 \leq X1/Y \leq 3.5$, or $1.4 \leq X2/Y \leq 3.5$ is satisfied. This can be applied to FIGS. 2A, 2B and 2C if $1.4 \leq Xa1/Ya \leq 3.5$, $1.4 \leq Xa2/Ya \leq 3.5$, $1.4 \leq Xb1/Yb \leq 3.5$, $1.4 \leq Xb2/Yb \leq 3.5$, $1.4 \leq Xc1/Yc \leq 3.5$, or $1.4 \leq Xc2/Yc \leq 3.5$.

In FIGS. 3A and 3B, it is preferred that the height A, the width B of the warp thread 31, and the height C and the width D of the weft thread 32 respectively satisfy $0.2 \leq A/B \leq 0.4$ and $0.1 \leq C/D \leq 0.4$. Herein, A and C may be identical or different. Likewise, B and D may be identical or different. Furthermore, A/B value and C/D value may be identical or different.

Although the above figures show the example of using one fiber bundle as each warp and weft thread, the thread formed by twisting a plurality of bundles can also be used in the present embodiment, that is, the present invention. By way of example, FIGS. 4A and 4B show the example of using a thread obtained by twisting two fiber bundles as each warp and weft thread, which is explained below.

Figure 4A:
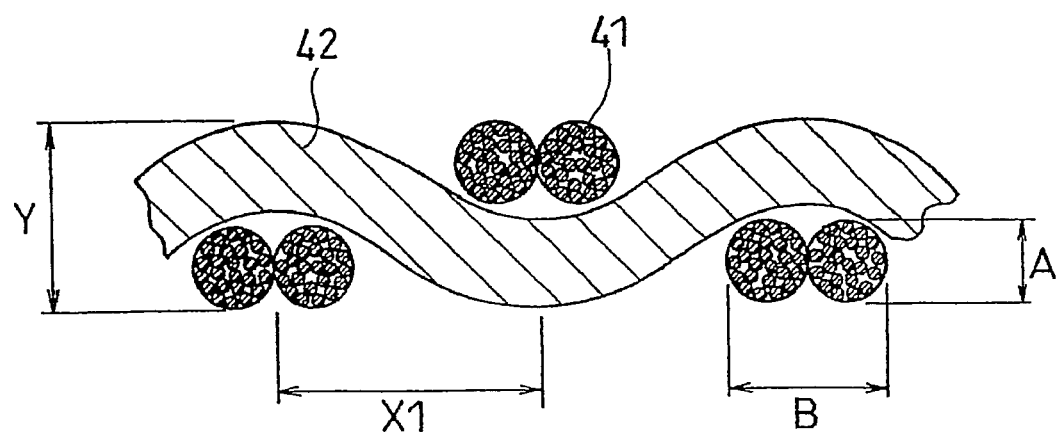
FIGS. 4A and 4B show other plain weave fabric which can be used for a gas diffusion layer for MEA in one embodiment of the present invention. To be more specific.
Figure 4B:
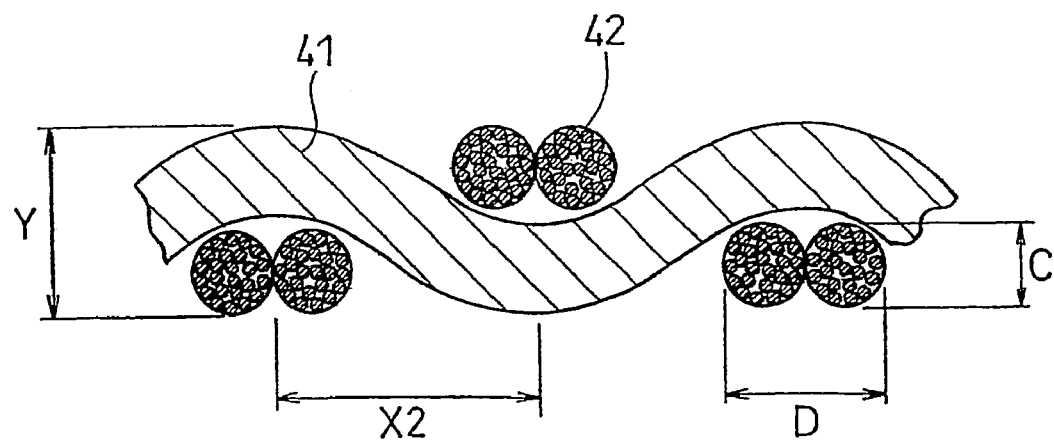

FIGS. 4A and 4B show other plain weave fabric which can be used for the gas diffusion layer for MEA in the embodiment of the present invention. To be more specific, FIG. 4A is a schematic sectional view taken along a plane vertical to the longitudinal direction of the warp thread, and FIG. 4B is a sectional view taken along a plane vertical to the longitudinal direction of the weft thread. As shown in the figures, the distance between the intersections, each of which is the central point of the portion where the warp thread 41 and the weft thread 42 cross each other, is referred to as "X1" between adjacent warp threads, and "X2" between adjacent weft threads. The intersection distances X1 and X2 may be identical or different. Either case is acceptable if $1.4 \leq X1/Y \leq 3.5$, or $1.4 \leq X2/Y \leq 3.5$ is satisfied. In FIGS. 4A and 4B, it is preferred that the height A and the width B of the warp thread 41, and the height C and the width D of the weft thread 42 respectively satisfy $0.2 \leq A/B \leq 0.4$ and $0.1 \leq C/D \leq 0.4$. Herein, A and C may be identical or different. Similarly, B and D may be identical or different. Moreover, A/B value and C/D value may be identical or different.

Although not shown in the figures, it is possible to use three or more fiber bundles to form each thread according to need. In addition, the number of fiber bundles in the warp thread and the number of fiber bundles in the weft thread may be different.

The foregoing mainly explained the examples in which the fabric is a plain weave. The examples described below also use a plain weave fabric. The use of a twill weave or sateen as shown in FIGS. 2B and 2C, however, also achieves the object on which the present invention is based or produces a preferred result if the above-described requirements or preferred requirements of the present invention are satisfied.

Examples of carbon fiber for fabric made of carbon fiber, in other words, carbon fiber that constitutes carbon cloth include PAN-type fiber, pitch-type fiber, phenol-type fiber, rayon-type fiber, etc. Among them, a PAN-type carbon fiber has high strength and less rigidity than a pitch-type fiber or the like. It also has high conductivity because it contains fewer impurities. For this reason, a PAN-type fiber is preferred. A pitch-type fiber is highly conductive, and therefore it is expected to be highly effective as the current collector. It is, however, highly rigid and inferior to a PAN-type fiber in terms of preventing the piercing of the polymer electrolyte membrane by the fibers. A phenol-type fiber tends to be amorphous, and is inferior to a PAN-type fiber because it is not highly productive at the time of baking and its production cost is high. A rayon-type fiber has not so much strength and a drawback in durability. It usually requires to be reinforced by the addition of a resin before it is used as a fabric, and, due to the use of a resin, a rayon-type fiber tends to have a higher electric resistance value than other material.

Next, in order to obtain a carbon fiber for producing such fabric, the baking temperature when carbonizing the material fiber is preferably not less than 1000° C. in terms of reducing resistance. More preferred is a carbon fiber graphitized at not less than 1500° C.

The present invention is intended to prevent a micro short-circuit resulting from the piercing of a polymer electrolyte membrane by carbon fibers, and the thinner the polymer electrolyte membrane is, the greater the effect is. In particular, the effect is greatly enhanced when the polymer electrolyte membrane has a thickness of 30 μm or less. In addition, the thickness of the catalyst layer has as great an influence as that of the polymer electrolyte membrane. Particularly, the effect remarkably appears in a thin-film catalyst layer, which is recently developed to minimize the loss due to resistance element by the thickness. In order to further prevent the micro short-circuit, it is preferred to form a water repellent layer on the substrate of the gas diffusion layer and the thickness of the water repellent layer is preferably large enough to completely cover the substrate so that the carbon fiber is unable to be seen on the surface of the gas diffusion layer. If the thickness is too large, however, the degradation of gas diffusibility and voltage reduction due to an increase in resistance occur. Preferred thickness of the water repellent layer is 1 to 50 μm from the substrate.

[II] Embodiment Whose Main Point is Pre-Smoothing Treatment of the Surface of Gas Diffusion Layer Now, an embodiment based on another aspect of the present invention is described.

The point of this embodiment is, using an appropriate heating technique, to pre-heat the surface of a gas diffusion layer substrate which is mainly composed of a carbon fiber and used for MEA of a polymer electrolyte fuel cell. The feature of the heating treatment is to remove fuzz of carbon fiber and the random asperities, in other words, to make the not-smoothed surface of the gas diffusion layer smooth, thereby preventing a micro short-circuit between two electrodes that occurs during the formation of MEA by pressing or thermal pressing, in short, preventing a physical short-circuit. Additionally, a micro short-circuit that occurs due to the addition of a clamping pressure to a fuel cell stack can also be prevented.

As the heating technique, flame radiation by a burner or the like, laser radiation, a radiant heater and the like are preferred, but there are other heating techniques, other than the above, which have effect in pre-smoothing treatment of the gas diffusion layer.

The smoothing of the surface of the gas diffusion layer substrate composed mainly of a carbon fiber using the above-mentioned heating technique also creates the effect of removing hydrophilic functional groups present on the surface of the carbon fiber. This imparts water repellency to the carbon fiber from which hydrophilic functional groups are removed, and improves the moisture retention of the polymer electrolyte contained in the MEA and the capability to rapidly and safely discharge excess water produced during the operation of the cell.

The pre-smoothing treatment based on the present embodiment is effective even when the gas diffusion layer substrate is made of carbon paper, carbon cloth or carbon non-woven fabric mainly composed of a carbon fiber.

When compared to one surface, i.e. catalytic reaction layer side, of the gas diffusion layer substrate and the other surface, i.e. separator plate side, thereof, the pre-smoothing treatment of the present embodiment is preferably performed only on the catalytic reaction layer side surface. The reason is as follows. By not performing the pre-smoothing treatment on the separator plate side surface of the gas diffusion layer substrate, the surface remains untreated and it is possible to maintain the surface not-smoothed with fuzz of carbon fiber and the like. This remaining not-smoothed surface attaches to the separator plate when incorporated into the cell stack, which is then clamped, thereby reducing the contact resistance between the gas diffusion layer and the separator plate.

The pre-smoothing treatment step in which fuzz and the like are removed by the heating technique is preferably performed before the step of subjecting the gas diffusion layer substrate to the water repellent treatment or the step of forming a conductive water repellent layer composed mainly of a carbon powder and a water repellent resin on the gas diffusion layer substrate.

It is to be noted that, although the technique based on the present embodiment [II] has the effect of enhancing the effect of the technique based on the above-described embodiment [I], it is not necessarily premised on the technique based on the above embodiment [I]. The effect thereof can be achieved even when it is premised on another gas diffusion layer structure.

In the following, the present invention or the present embodiment is specifically described using examples.

[I] Example Whose Main Point is Gas Diffusion Layer Structure

First of all, Examples 1 to 3 and Comparative example 1 are described as examples whose main point is gas diffusion layer structure of the present embodiment.

EXAMPLE 1

First, one hundred polyacrylonitrile (PAN) fibers with a thickness of 7 μm were twisted into a bundle. Then, the two obtained bundles were twisted to give a thread. The obtained threads serving as warp and weft threads were woven into a plain weave fabric as schematically shown in FIGS. 4A and 4B. The obtained fabric was heated under a nitrogen atmosphere at 1500° C. for 6 hours for graphitization to give a carbon cloth, that is, a substrate for gas diffusion layer. This substrate is referred to as base substrate "S1". The distance X between adjacent intersections in the obtained carbon cloth was 600 μm and the thickness Y was 280 μm. Thus, X/Y was 2.1. Furthermore, the height A of the warp thread and the height C of the weft thread were respectively 140 μm, the width B of the warp thread and the width D of the weft thread were respectively 450 μm. Accordingly, A/B and C/D were respectively 0.3.

Subsequently, a diluted FEP dispersion was prepared by mixing 1 parts by weight of a dispersion of FEP (fluoroethylene propylene, more specifically, a copolymer of terafluoroethylene and hexafluoropropylene) manufactured by DAIKIN INDUSTRIES, LTD. (trade name: Neoflon ND-1) with 10 parts by weight of water. The base substrate S1 was immersed in the diluted dispersion for 1 minute and then lifted from the dispersion. The lifted base substrate S1 was dried first at 60° C. for 30 minutes and then at 280° C. for 1 hour to give a base substrate S1 with its surface treated with the water repellent resin. The obtained substrate was referred to as "S2". Carbon cloth lint was found in the remaining of the FEP dispersion after the water repellent treatment. The lint was carbon fiber pieces cut from the fabric when the fabric was cut. This lint was left in the diluted FEP dispersion.

Then, 5 parts by weight of acetylene black and 1 part by weight of PTFE (polytetrafluoroethylene) were mixed with 20 parts by weight of water to give an aqueous dispersion. The dispersion was applied on one surface of the substrate S2 obtained above by a doctor blade, which was then dried first at 60° C. for 1 hour and then 300° C. for 15 minutes to give a gas diffusion layer substrate. This gas diffusion layer substrate (GDL) was referred to as "G1". The obtained gas diffusion layer substrate G1 had a water repellent layer with a thickness of 30 μm.

Next, a 25 μm thick polymer electrolyte membrane (trade name: Nafion 111) manufactured by E.I. Du Pont de Nemours & Co. Inc. of USA was prepared. Meanwhile, a catalyst comprising 100 parts by weight of carbon fine powder (trade name: Ketjen Black EC) manufactured by Lion Corporation and 100 parts by weight of platinum catalyst carried on the carbon fine powder was mixed with 100 parts by weight of perfluorocarbon sulfonic acid resin, the same polymer material as that of Nafion 111 membrane, which was then applied on both surfaces of the polymer electrolyte membrane to form a coating film thereon. The coating film was joined to the polymer electrolyte membrane by thermal welding at 120° C.; thereby, a catalyst layer with a thickness of 20 μm was respectively formed on both surfaces of the polymer electrolyte membrane. The two obtained gas diffusion layer substrates G1 produced above were prepared. The two gas diffusion layer substrates G1 were respectively arranged on the catalyst layers formed as above such that the water repellent layer of each substrate G1 is attached to each catalyst layer, and the thus-obtained stack was then hot-pressed at 100° C. for 3 minutes to give an electrolyte membrane-electrode assembly (MEA). The MEA in as-produced condition, that is, the MEA without pressure, i.e. clamping pressure, applied in the stacked direction was referred to as "M1".

As described referring to FIG. 1 in the above embodiment, conductive separators made of carbon, which are equipped with a plurality of grooves serving as gas channels on the surface to be in contact with the gas diffusion layer substrate G1 of the MEA, were respectively disposed on the MEA. Furthermore, a gasket assembly was also disposed as described above, and the MEA was sandwiched by the two conductive separator plates. On each of the conductive separator plates, a conductive separator plate for forming a cooling water unit was placed to give a unit cell base structure. On each of the separator plates for cooling water unit of the unit cell base structure, an insulating plate was disposed. Finally, a pressing machine equipped with two flat press-platens was prepared and a pressure was applied in the following manner. Specifically, the unit cell stack was held between the two flat press-platens such that each of the insulating plates on the unit cell stack was in contact with each of the flat press-platens. Then, a pressure of 10 kgf/cm$^2$ was applied by the pressing machine per the area where the rib portion between gas channels of the separator is in contact with the gas diffusion layer substrate G1 of the MEA in order to press the unit cell; thereby, a test fuel cell F1 according to the present example 1 was produced.

The thus-obtained fuel cell F1 according to the present example, and the MEA (M1) used therefor, the gas diffusion layer substrate G1 used therefor, the substrate S2 used therefor and the base substrate S1 used therefor and produced at the beginning of the present example were respectively measured for particular characteristics. The following describes the procedure.

First, micro short-circuit detection test was performed as follows. There were prepared two base substrates S1, two substrates S2, two gas diffusion layer substrates G1. Using two substrates, for example, two S1 substrates were allowed to hold therebetween a Nafion 111 polymer electrolyte membrane with a thickness of 25 μm, the same thickness as the above, to give an MEA for this test. On the outer faces of the test MEA, two copper metal plates plated with gold were disposed. Further, on the outer faces thereof, two rigid insulating plates were arranged; thereby, a stack for this test was produced. The test stack was held by the pressing machine, onto which a surface pressure of 10 kgf/cm$^2$ was applied. With that pressure applied, a DC voltage of 200 mV was applied between the two metal plates. Then, the resistance value between the two metal plates, i.e. the resistance value of the test MEA, was calculated.

In the micro short-circuit detection test of the MEA (M1), two copper metal plates plated with gold analogous to those used in the above were allowed to directly hold the MEA. On the outer faces thereof, two rigid insulating plates' were disposed; thereby, a stack for this test was produced. Similar to the above, a surface pressure of 10 kgf/cm$^2$ was applied to the stack for this test using the pressing machine, and at the same time a DC voltage of 200 mV was applied between the two metal plates. Thereby, the resistance value of the MEA (M1) was calculated.

Finally, as for the test fuel cell F1, a DC voltage of 200 mV was directly applied between the two conductive separator plates respectively attaching to each surface of the MEA contained in the test fuel cell F1. Thereby, the resistance value of the MEA contained in the test fuel cell F1 was calculated.

The calculation for the resistance value thereof using a DC voltage of 200 mV was made as follows. Specifically, the initial transient current flowing through the MEA right after the application of a DC voltage of 0.200 mV is a large electric current because of the ionic conductivity of the MEA. Accordingly, after the effect of the ionic conductivity ran out and the electric current entered a steady state, a current value was measured with a voltage of 200 mV applied. As a sufficient interval, a 5-minute interval from the application of the voltage was selected in each measurement. The resistance value (kΩ·cm$^2$) to be determined was obtained by dividing the voltage value applied (200 mV) by the measured current value, which was then multiplied by the area of the measured MEA (the area of the gas diffusion layer substrate).

The resistance value of each test MEA obtained through the measurement and the calculation is shown in the row of Example 1 of Table 1 given below.

Then, the test fuel cell F1 was put through a unit cell durability test described below in order to evaluate reliability.

Specifically, the fuel cell F1 was put through 1000 cycles of repeated operation and shutdown while a pure hydrogen gas was supplied to one gas diffusion layer substrate serving as the fuel electrode, and air was supplied to the other gas diffusion layer substrate serving as the air electrode. The conditions for the test were as follows. The cell temperature was maintained at 75° C., and the fuel gas utilization rate, the air utilization rate and the current density were respectively set at 75%, 40% and 0.2 A/cm$^2$. Further, the fuel gas and the air were heated and humidified to have a dew point of 75° C. through bubblers respectively before they were supplied to the fuel cell F1. Under this condition, the fuel cell F1 was operated for 3 hours as a hydrogen-air fuel cell, and then shut down for 1 hour. The cycle of 3-hour operation and 1-hour shutdown was repeated. Based on this reliability evaluation test, the cell voltage at the first cycle when operated at a current density of 0.2 A/cm², the cell voltage at the 1000th cycle when operated at a current density of 0.2 A/cm² were measured, and the open cell voltage with no load was also measured before the operation of the first cycle with the heated and humidified fuel gas and air supplied. The results for the measurement are shown in the row of F1 of Table 3 given below.

It is to be noted that the cell voltage at the first cycle and the cell voltage at the 1000th cycle used herein mean the average values of the cell voltages measured continually during the last 10 minutes, i.e. 10 minutes between 2 hours and 50 minutes and 3 hours after the start of the operation, of the 3-hour operation at the first and the 1000th cycle.

In the same manner as the test fuel cell F1 using the base substrate S1 in accordance with Example 1 described above was produced, eight additional base substrates S1a to S1h were produced by varying X/Y value within the range of 1.4 to 3.5 and also changing A/B value and C/D value. Using the base substrates, eight additional test fuel cells F1a to F1h were produced. Subsequently, the effects of the changes of X/Y value, A/B value and C/D value on the open cell voltage, the cell voltage at the first cycle and the cell voltage at the 1000th cycle of the test fuel cell were investigated. The row of the base substrate S1 of Table 2 given below shows the data of the above-produced base substrate S1 that has already shown in Table 1, the rows of S1a to S1h show the data of the newly produced base substrates. The rows of the test fuel cells F1a to F1h of Table 3 show the data of the newly produced test fuel cells.

COMPARATIVE EXAMPLE 1

A base substrate CS1 in accordance with Comparative example 1 was produced in the same manner as the base substrate S1 was produced in Example 1, except that the values of X, Y, A, B, C and D were altered. The obtained carbon cloth of the base substrate CS1 had a distance X between intersections of 400 μm and a thickness Y of 320 μm. The height A of the warp thread and the height C of the weft thread were respectively 160 μm, and the widths B and D were respectively 380 μm. Accordingly, X/Y value was 1.3, A/B value and C/D value were respectively 0.4.

Then, a substrate CS2 whose surface was treated with a water repellent resin, a gas diffusion layer substrate CG1 using the substrate CS2, an MEA using the gas diffusion layer substrate CG1 (CM1), and a test fuel cell CF1 using the MEA (CM1) were produced as the first sample group of Comparative example 1 in the same manner as in Example 1.

Those in the first sample group were put through the same resistance value measurement and cell voltage measurement as those performed in Example 1. Their results are shown in the rows of Comparative example 1 of Table 1 and the row of CF1 of Table 3.

In the same manner as the test fuel cell CF1 using the base substrate CS1 in accordance with Comparative example 1 described above was produced, three additional base substrates CS1a, CS1b and CS1c were produced by altering X/Y value, A/B value and C/D value as comparative examples. Using the base substrates, three additional test fuel cells CF1a, CF1b and CF1c were produced as the second sample group. Subsequently, the effects of the changes of X/Y value, A/B value and C/D value on the open cell voltage, the cell voltage at the first cycle and the batter voltage at the 1000th cycle of the test fuel cell were investigated. The row of the base substrate CS1 of Table 2 shows the data of the above-produced base substrate CS1 that has already shown in Table 1, and the rows of CS1a, CS1b and CS1c show the data newly produced base substrates. Further, the rows of CF1a, CF1b and CF1c of Table 3 show the data of the newly produced test fuel cells.

EXAMPLE 2

In this example, a substrate and a test fuel cell as described below were produced in the same manner as in Example 1, except that a plain weave fabric comprising a warp thread comprising two bundles twisted and a weft thread comprising one bundle was used instead of the plain weave fabric of Example 1.

First, a bundle was formed by twisting 100 PAN fibers with a diameter of 15 μm, and another same bundle was formed. Then, two bundles formed as above were twisted to prepare a warp thread. Next, a weft thread was prepared by twisting 100 PAN fibers with a diameter of 15 μm. A plain weave fabric was formed using the obtained warp and weft threads. The plain weave fabric was heated at 1500° C. under a nitrogen atmosphere for 6 hours for graphitization to give a base substrate. This base substrate is referred to as "S3". The obtained carbon cloth had a distance X between intersections of 500 μm and an intersection thickness Y of 250 μm. Accordingly, X/Y was 2.0. Additionally, the warp thread had a height A of 140 μm and a width B of 450 μm, and a weft thread had a height C of 110 μm and a width D of 450 μm. Thus, A/B was 0.3 and C/D was 0.2.

Subsequently, the base substrate S3 was put through the same processes as in Example 1, and a substrate S4 whose surface treated with the water repellent resin and a gas diffusion layer substrate G2 obtained by forming the water repellent layer on one side surface of the substrate S4 were procured. Using the same manner as in Example 1, the catalyst layer was formed on both surfaces of the polymer electrolyte membrane, and, on the outer face thereof, the gas diffusion layer substrate G2 was disposed such that its water repellent layer and the catalyst layer are in contact with each other, thereby giving an MEA (M2). Using the MEA (M2), a test fuel cell F2 was produced.

Those in this sample group were put through the same resistance value measurement and cell voltage measurement as those performed in Example 2. Their results are shown in the rows of Example 2 of Table 1 and the row of F2 of Table 3. It is to be noted that the row of S3 of Table 2 shows the data corresponding to those in Table 1.

EXAMPLE 3

In this example, a substrate and a test fuel cell as described below were produced in the same manner as in Example 2; however, unlike Example 2, a base substrate was not surface-treated with the water repellent resin.

To be more specific, a substrate was produced by forming the water repellent carbon layer on one face of the base substrate S3 produced in Example 2, in the same manner as in Example 1. Then, a gas diffusion layer substrate G3 using the substrate, an MEA using the gas diffusion layer substrate G3 (M3), and a test fuel cell F3 using the MEA were produced in the same manner as in Example 1.

Those in this sample group were put through the same resistance value measurement and cell voltage measurement as those performed in Example 1. Their results are shown in the rows of Example 3 of Table 1 and the row of F3 of Table 3.

TABLE 1

| Ex/Comp. ex. | Substrate/GDL/MEA/Cell | Base substrate | Water repellent treatment | Water repellent layer thickness | Polymer film thickness | Catalyst layer thickness | Clamping pressure [kgf/cm²] | Resistance value [kΩ · cm²] | X/Y |
|---|---|---|---|---|---|---|---|---|---|
| Ex. 1 | S1 | S1 | No | — | — | — | — | 10 | 2.1 |
|  | S2 |  | Yes |  |  |  |  | 12 |  |
|  | G1 |  |  | 30 μm |  |  |  | 16 |  |
|  | M1 |  |  |  | 25 μm | 20 μm |  | 18 |  |
|  | F1 |  |  |  |  |  | 10 | 18 |  |
| Ex. 2 | S3 | S3 | No | — | — | — | — | 12 | 2.0 |
|  | S4 |  | Yes |  |  |  |  | 14 |  |
|  | G2 |  |  | 30 μm |  |  |  | 18 |  |
|  | M2 |  |  |  | 25 μm | 20 μm |  | 20 |  |
|  | F2 |  |  |  |  |  | 10 | 20 |  |
| Ex. 3 | G3 | S3 | No | 30 μm | — | — | — | 13 | 2.0 |
|  | M3 |  |  |  | 25 μm | 20 μm |  | 15 |  |
|  | F3 |  |  |  |  |  | 10 | 15 |  |
| Comp. Ex. 1 | CS1 | CS1 | No | — | — | — | — | 0.2 | 1.3 |
|  | CS2 |  | Yes |  |  |  |  | 0.5 |  |
|  | CG1 |  |  | 30 μm |  |  |  | 1.8 |  |
|  | CM1 |  |  |  | 25 μm | 20 μm |  | 2.8 |  |
|  | CF1 |  |  |  |  |  | 10 | 3.0 |  |

TABLE 2

| Ex./Comp. Ex. | Base substrate | X | Y | X/Y | A | B | A/B | C | D | C/D |
|---|---|---|---|---|---|---|---|---|---|---|
| Ex. 1 | S1 | 600 | 280 | 2.1 | 140 | 450 | 0.3 | 140 | 450 | 0.3 |
|  | S1a | 390 | 280 | 1.4 | 140 | 340 | 0.4 | 140 | 370 | 0.4 |
|  | S1b | 600 | 250 | 2.4 | 130 | 550 | 0.2 | 120 | 600 | 0.2 |
|  | S1c | 900 | 280 | 3.2 | 180 | 700 | 0.3 | 100 | 850 | 0.1 |
|  | S1d | 665 | 190 | 3.5 | 96 | 455 | 0.2 | 94 | 445 | 0.2 |
|  | S1e | 1050 | 300 | 3.5 | 200 | 550 | 0.4 | 100 | 1000 | 0.1 |
|  | S1f | 1050 | 300 | 3.5 | 200 | 550 | 0.4 | 100 | 900 | 0.1 |
|  | S1g | 1050 | 300 | 3.5 | 200 | 550 | 0.4 | 100 | 250 | 0.4 |
|  | S1h | 1050 | 300 | 3.5 | 200 | 550 | 0.4 | 100 | 220 | 0.5 |
| Comp. Ex. 1 | CS1 | 400 | 320 | 1.3 | 160 | 380 | 0.4 | 160 | 380 | 0.4 |
|  | CS1a | 400 | 420 | 1.0 | 210 | 390 | 0.5 | 210 | 390 | 0.5 |
|  | CS1b | 400 | 340 | 1.2 | 170 | 390 | 0.4 | 170 | 390 | 0.4 |
|  | CS1c | 900 | 250 | 3.6 | 140 | 450 | 0.3 | 110 | 450 | 0.2 |
| Exs. 2, 3 | CS3 | 500 | 250 | 2.0 | 140 | 450 | 0.3 | 110 | 450 | 0.2 |

TABLE 3

| Ex./Comp. Ex. | Test fuel cell | Base substrate | Open cell voltage (mV) | Cell voltage during operation (mV) 1st cycle | Cell voltage during operation (mV) 1000th cycle |
|---|---|---|---|---|---|
| Ex. 1 | F1 | S1 | 951 | 780 | 778 |
|  | F1a | S1a | 907 | 762 | 713 |
|  | F1b | S1b | 929 | 773 | 770 |
|  | F1c | S1c | 935 | 764 | 748 |
|  | F1d | S1d | 942 | 776 | 734 |
|  | F1e | S1e | 952 | 752 | 701 |
|  | F1f | S1f | 948 | 754 | 725 |
|  | F1g | S1g | 945 | 747 | 722 |
|  | F1h | S1h | 939 | 750 | 700 |
| Comp. Ex. 1 | CF1 | CS1 | 918 | 762 | 651 |
|  | CF1a | CS1a | 800 | 709 | 502 |
|  | CF1b | CS1b | 820 | 728 | 549 |
|  | CF1c | CS1c | 928 | 731 | 676 |
| Ex. 2 | F2 | S2 | 952 | 782 | 781 |
| Ex. 3 | F3 | S3 | 947 | 777 | 769 |

As shown in Tables 1 and 2, the substrates produced in Examples 1 and 2 exhibited higher resistance values than those produced in Comparative example 1. This indicates that the micro short-circuit can be reduced when they are used as fuel cells. Thereby, it is possible to provide a fuel cell with high reliability. The substrates whose ratio of the distance X between adjacent intersections where the warp and weft threads cross each other to the intersection thickness Y was $1.4 \leq X/Y \leq 3.5$ had an improved elasticity in the direction vertical to the face of the substrate, in other words, in the thickness direction of the substrate. Therefore, it is also evident that even after a pressure was applied to both faces of the substrate, the surface concave and convex portions were reduced and the piercing of the polymer electrolyte membrane by the carbon fibers was prevented.

Conversely, it is apparent that, in the substrate with low elasticity in the thickness direction of the substrate like a conventional substrate produced in Comparative example, the carbon fibers pierced the polymer electrolyte membrane to cause a micro short-circuit, thereby reducing the resistance value. The effect of preventing the micro short-circuit was also able to be observed in the carbon cloth with water repellent-treated surface and the substrate with the water repellent carbon layer formed on the surface thereof.

Figure 5:
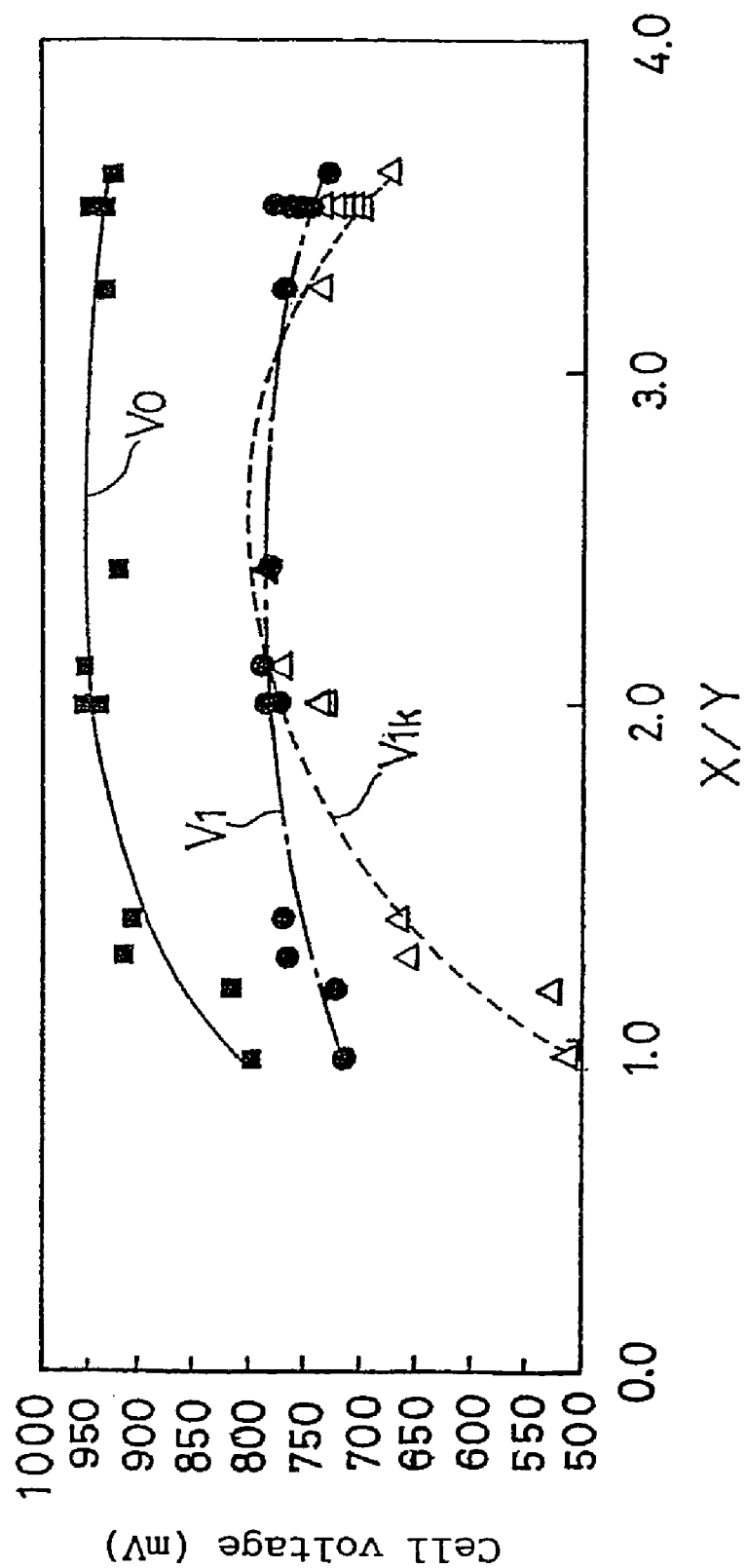
FIG. 5 is a characteristic graph showing the relations between the X/Y value and the cell voltage, and between the X/Y value and the open cell voltage of a polymer electrolyte fuel cell in Examples and Comparative example of the present invention.
Figure 6:
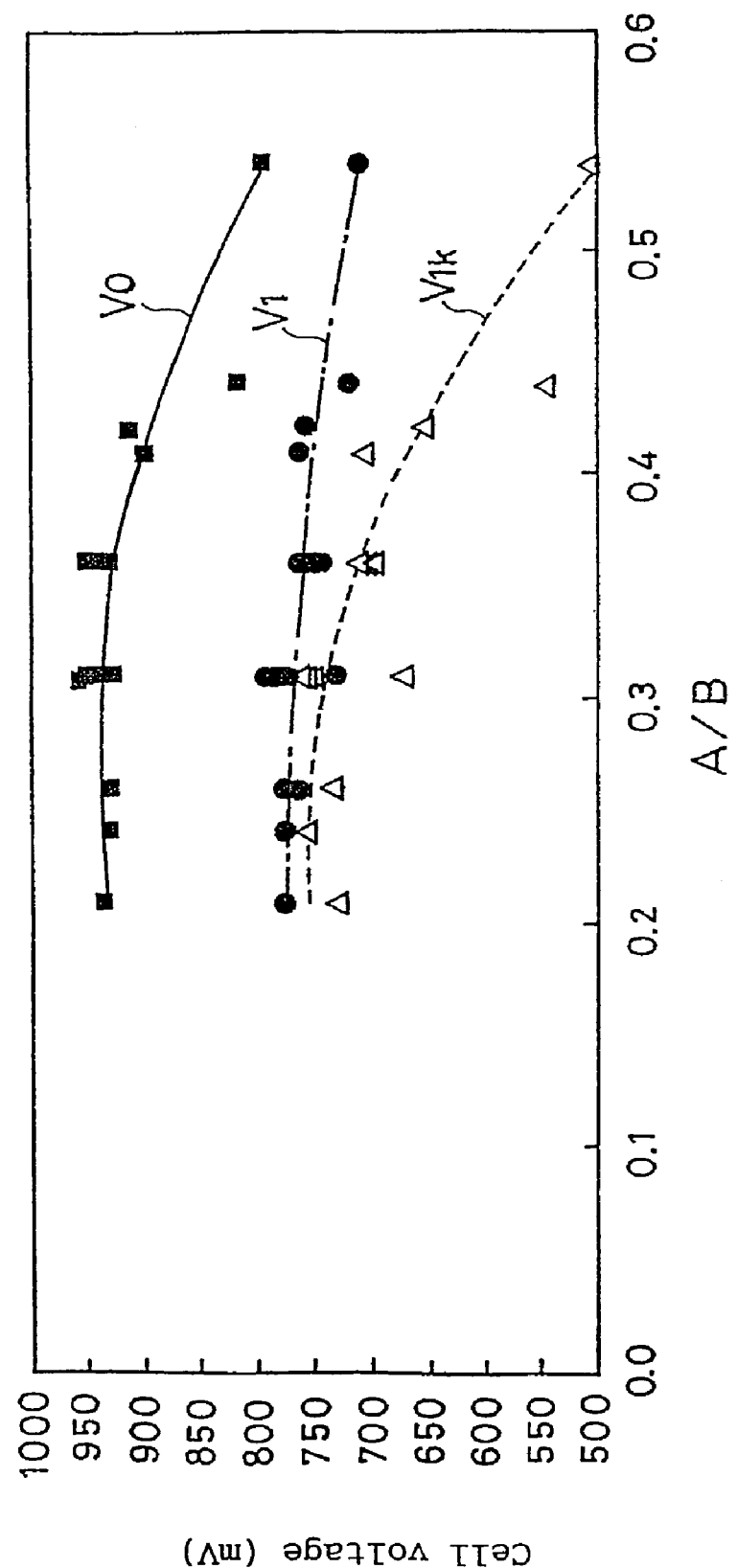
FIG. 6 is a characteristic graph showing the relations between the A/B value and the cell voltage, and between the A/B value and the open cell voltage of a polymer electrolyte fuel cell in Examples and Comparative example of the present invention.
Figure 7:
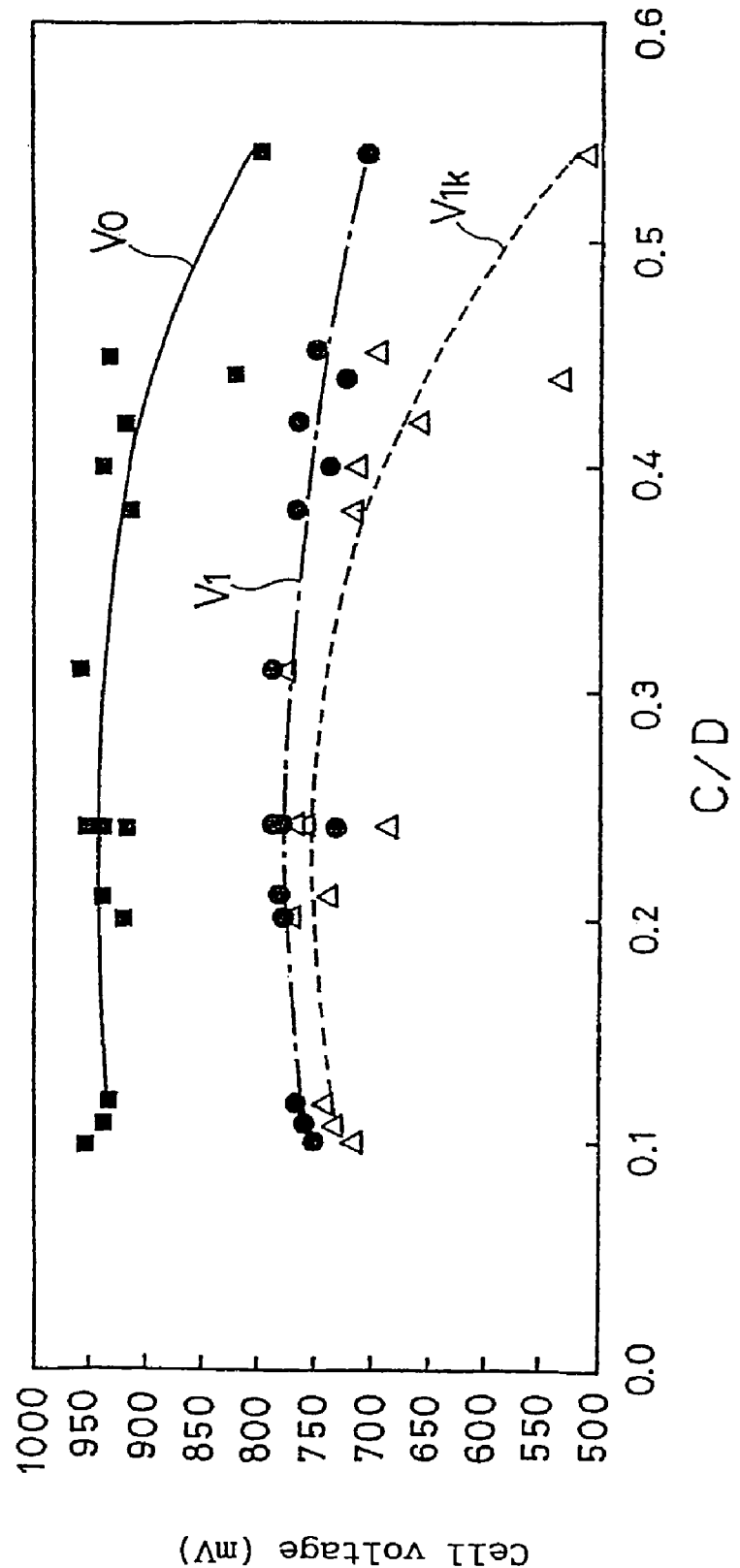
FIG. 7 is a characteristic graph showing the relations between the C/D value and the cell voltage, and between the C/D value and the open cell voltage of a polymer electrolyte fuel cell in Examples and Comparative example of the present invention.

FIGS. 5, 6 and 7 are characteristic graphs obtained by plotting, on the graphs, the data of Examples 1 to 3 and Comparative example 1 shown in Tables 2 and 3. The vertical axis of each graph represents the cell voltage and open cell voltage of each fuel cell. Regarding the cell voltage, both the cell voltage at the first cycle and the one at the 1000th cycle were plotted to form characteristic curves. The horizontal axes respectively represent X/Y value, A/B value and C/D value. Each of the graphs show average characteristic curves describing the distributions of V0 representing the open cell voltage, V1 representing the cell voltage at the first cycle and V1$k$ representing the cell voltage at the 1000th cycle.

As is evident from these graphs, the fuel cells using the substrate whose ratio of the distance X between adjacent intersections where the warp and weft threads cross each other to the intersection thickness Y was $1.4 \leq X/Y \leq 3.5$ exhibited better results than the conventional fuel cell produced according to Comparative Example 1. Additionally, the substrates in which the distance X and the thickness Y satisfies $1.4 \leq X/Y \leq 3.5$ and the height A and the width B of the warp thread and the height C and the width D of the weft thread satisfy $0.2 \leq A/B \leq 0.4$ and $1 \leq C/D \leq 0.4$ exhibited better characteristics.

Now, the relation between the theoretical value of the open cell voltage and the open cell voltage of the practical fuel cell described above is explained. It is well known that, when a hydrogen electrode is used as the fuel electrode and an oxygen electrode is used as the oxidant electrode, the theoretical value of the open cell voltage, that is, the electric potential difference between the hydrogen and oxidant electrodes is about 1230 mV. Since the electrolyte membrane is thin or the electrolyte membrane has pores in the practical fuel cell, a cross leak between hydrogen and oxygen occurs. Therefore, the open cell voltage is lower than the theoretical value. If the electrolyte membrane thickness and the pores of the electrolyte membrane are compared, the pores affect the open cell voltage more. In the above experiments, this is the reason that the open cell voltages of Examples and Comparative example were below 1230 mV.

Since a gas is fed into a fuel cell mainly from outside as the fuel for power generation, it is of importance that a fuel cell has high sealing property. Accordingly, it is necessary to apply a clamping force in order to prevent a gas leakage. However, the pressure is applied from both faces of the electrodes to the center of the polymer electrolyte membrane, from the outer surfaces to the polymer electrolyte membrane; thus, the carbon fibers constituting the gas diffusion electrode substrate pierce the thin film polymer electrolyte membrane, causing a micro short-circuit. The fuel cell with internal short-circuit has low initial performance, and the area of short circuit enlarges with the passage of time, thus reducing the voltage. When the cell is continuously operated for power generation, the polymer electrolyte membrane is always in the state of oversaturation with water and therefore the distance between the facing carbon cloths serving as the gas diffusion electrode substrates is increased due to the swelling of the polymer electrolyte membrane. Conversely, when the operation is stopped, the polymer electrolyte dries and contracts, thereby reducing the distance between the electrodes. Accordingly, during the repetition of operation and shutdown, the carbon fibers of the gas diffusion electrode substrate gradually pierce the polymer electrolyte membrane, and the area of micro short-circuit gradually enlarges.

As described above, it was confirmed that, in the base substrate, gas diffusion layer substrate, or fuel cell using them in accordance with this embodiment, the use of a carbon cloth in which the ratio of the distance X between adjacent intersections where the warp and weft threads cross each other to the intersection thickness Y satisfies $1.4 \leq X/Y \leq 3.5$ and the height A and the width B of the warp thread and the height C and the width D of the weft thread respectively satisfy $0.2 \leq A/B \leq 0.4$ and $0.1 \leq C/D \leq 0.4$ can further prevent the carbon fibers from piercing the polymer electrolyte membrane and reduce the micro short-circuit when the fuel cell is clamped and operated, thereby providing a fuel cell with high reliability. In was also confirmed in other experiments that when the ratio of A/B or that of C/D exceeds 0.4, the desired reduction effect diminishes and the distance between the warp threads or that between the weft threads is likely to be long enough to eventually cause a polarization in the current collection of the fuel cell. On the other hand, when A/B is less than 0.2, the warp threads are excessively weakened, making it difficult to produce a fabric with sufficient strength. Furthermore, when C/D is less than 0.1, threads are likely to be separated to make the fabric surface rough, thereby reducing the ability of the fuel cell to collect a current. It was also confirmed that the contact resistance between the fabric and the catalyst layer, that between the fabric and the separator plate and the electric resistance in the fabric are likely to increase to reduce the cell voltage.

Although not apparent from the description of the above examples, other experiments also revealed that there are additional preferred requirements in the present embodiment, which are described below.

First, it was confirmed in other experiments that, when a consecutive warp thread is used and a weft thread is disposed vertical thereto, that is, when the fabric is wound in the direction of the warp thread, the height C and the width D of the weft thread preferably satisfy $0.1 \leq C/D \leq 0.3$. It was found that, in a consecutive cloth, typically in a hooped cloth, by coarsely weaving weft threads which are not required to have strength on the contrary to warp threads which are required to have strength, it is possible to reduce the surface concave and convex portions of the whole substrate and to prevent the piercing of the polymer electrolyte membrane by the fibers.

Next, it was confirmed that in other experiments that it is preferred that the substrate has a water repellent layer comprising a carbon fine powder and a water repellent resin on the surface of the substrate on the catalyst layer side, and the water repellent layer has a thickness of 1 to 50 μm. The substrate whose surface is conductive and having a layer with water repellency has the effect of increasing the distance between the polymer electrolyte membrane and the substrate when the polymer electrolyte membrane and the electrode are attached. It was also confirmed that this can further prevent the fibers from appearing on the electrode surface, whereby the piercing of the polymer electrolyte membrane by the fibers can be prevented. In order to reduce the micro short-circuit, the thicker the water repellent layer is, the better the effect becomes. An excessively thick water repellent layer, however, results in increased resistance, leading to performance degradation. Accordingly, the thickness is preferably not more than 50 μm. It was found that when the thickness is less than 1 μm, on the other hand, it is difficult to prevent the piercing of the polymer electrolyte membrane by the carbon fibers. In view of these points, it was also found that a more preferred thickness range is from 20 to 30 μm.

It was further confirmed in other experiments that the polymer electrolyte membrane preferably has a thickness of 9 to 50 μm. This thickness range has the effect of increasing the distance between the substrate on the positive electrode side and the substrate on the negative electrode side when the polymer electrolyte membrane and the electrode are attached. As a result, the performance degradation due to the micro short-circuit can be prevented. It was confirmed, however, when the thickness is greater than 50 μm, the resistance to ion transfer increases to reduce ionic conductivity, leading to the lowering of the cell voltage. In addition, it was confirmed that the use of such thick polymer electrolyte membrane is likely to increase the resistance to water diffusion, which affects the balance of water content in the polymer electrolyte membrane, making the membrane excessively wet or excessively dry. It was also confirmed that when the thickness is less than 9 μm, on the other hand, the effect of increasing the distance between the substrate on the positive electrode side and the substrate on the negative electrode side cannot be expected.

Furthermore, it was confirmed in other experiments that the catalyst layer preferably has a thickness of 1 to 30 μm. This thickness range has the effect of increasing the distance between the polymer electrolyte membrane and the substrate when the polymer electrolyte membrane and the electrode are attached, whereby the piercing of the polymer electrolyte membrane by the fibers can be prevented. When the thickness is greater than 30 μm, however, the gas diffusibility decreases to reduce the cell voltage. It was also confirmed that the ionic conductivity decreases, thereby leading to the lowering of the cell voltage. It was also found that when the thickness is less than 1 μm, on the other hand, the effect of increasing the distance between the polymer electrolyte membrane and the substrate cannot be expected. On the other hand, it was confirmed that the effect of increasing the distance between the polymer electrolyte membrane and the substrate cannot be expected.

Further, it was confirmed in other experiments that it is preferred to apply a clamping pressure of 1 to 20 kgf/cm$^2$ per the contact area between each electrode and each conductive separator plate of the polymer electrolyte fuel cell comprising: the MEA in which the distance X between adjacent intersections where the warp and weft threads cross each other and the thickness Y of the fabric satisfy the equation $1.4 \leq X/Y \leq 3.5$; and a pair of conductive separator plates with gas channels on the surface in contact with the gas diffusion layer of the MEA. It was found that, by setting the clamping force at not greater than 20 kgf/cm$^2$, it is possible to prevent the fibers of the gas diffusion layer from piercing the polymer electrolyte membrane. However, the clamping pressure of less than 1 kgf/cm$^2$ is not preferred because the cell voltage is likely to decrease due to the increases in the contact resistance at a plurality of portions and in the electric resistance within the fabric. It is to be understood that the contact resistance at a plurality of portions means the contact resistance between the fabric and the catalyst layer, that between the fabric and the separator plate, that between the electrolyte membrane and the catalyst layer and that between separator plates when a plurality of cells are stacked.

[II] Example Whose Main Point is Pre-Smoothing Treatment of the Surface of Gas Diffusion Layer Now, Example 4 and Comparative example 2 are described as examples whose main point is pre-smoothing treatment of the surface of the gas diffusion layer.

EXAMPLE 4

This example used flame radiation, laser radiation and an electric heating radiation as the heating technique for the heating step for pre-smoothing the gas diffusion layer surface. Among them, the case of using flame radiation is described below as a first embodiment.

First, a fabric to be subjected to pre-smoothing treatment was prepared as follows using the same method as the base substrate was produced in Example 1. Specifically, 100 polyacrylonitrile (PAN) fibers with a thickness of 7 μm were twisted into a bundle. Then, the two obtained bundles were twisted to give a thread. The obtained threads serving as warp and weft threads were woven into a plain weave fabric as schematically shown in FIGS. 4A and 4B. The obtained fabric was heated at 1500° C. under a nitrogen atmosphere for 6 hours for graphitization to give a carbon cloth, that is, a substrate for gas diffusion layer.

Figure 8:
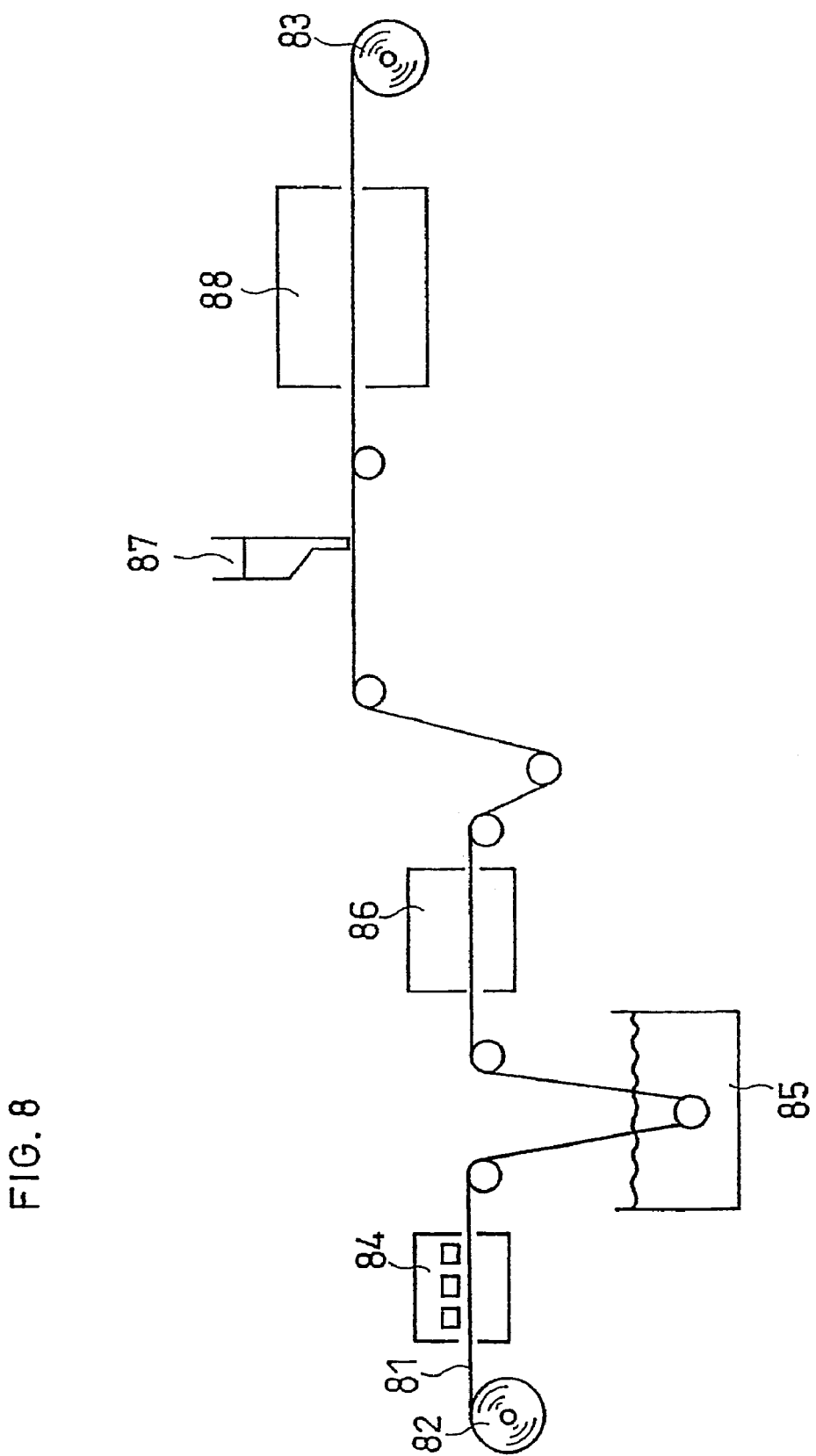
FIG. 8 is a schematic system diagram showing a treatment process including a surface smoothing treatment of a gas diffusion layer in Example and Comparative example of the present invention.

Subsequently, the thus-produced carbon cloth was subjected to the following sequential steps to give a gas diffusion layer substrate: (1) a step of removing fuzz of carbon fiber and the random asperities by flame radiation with the use of a burner; (2) a step of performing a water repellent treatment in which the carbon cloth was immersed in an aqueous dispersion of fluorocarbon resin (made by diluting D-1 with water, available from DAIKIN INDUSTRIES, LTD.) and then dried; and (3) a step of forming a conductive water repellent layer by spraying, onto the substrate, a paste-like conductive water repellent layer ink obtained by mixing acetylene black (DENKA BLACK, manufactured by Denki Kagaku Kogyo KK) and an aqueous dispersion of fluorocarbon resin (D-1, manufactured by DAIKIN INDUSTRIES, LTD.) with surfactant-added water in order to form a conductive water repellent layer composed mainly of acetylene black powders and a fluorocarbon resin, and then baking the substrate in order to remove the surfactant therefrom and fix the conductive water repellent layer to the carbon cloth. The drying temperature in the water repellent treatment step was set at 120° C., the heating temperature after spraying the conductive water repellent layer was set at 350° C., and drying and heating time was set at 1 hour. FIG. 8 is a schematic system diagram showing an outline of the sequential treatment process including the surface smoothing process of the gas diffusion layer in accordance with Example 4. It is to be noted that the face to be treated from which fuzz is removed is the face on which the conductive water repellent layer is formed, which will eventually be the catalytic reaction layer side. As previously described, it is preferred not to remove the fuzz of the gas diffusion layer substrate on the separator side.

The steps described above is explained referring to FIG. 8. A gas diffusion layer substrate 81 is dispensed from a dispensing roller member 82 and eventually wound on a take-up roller member 83 for gas diffusion layer substrate. First, the substrate 81 dispensed from the dispensing roller member is fed to a burner 84 serving as pre-smoothing treatment portion and the fuzz present on the surface of the substrate 81 is removed by the flame radiation from the burner 84 for smoothing the substrate surface. The substrate 81 with the surface smoothing treated is immersed in an immersion bath 85 for water repellent treatment, whereby a solution for water repellent treatment is applied onto the outer face of the substrate 81 as well as onto the internal wall surface of pores. The applied layer of the water repellent solution is dried at a drying chamber 86 to make the whole substrate 81 water repellent. Subsequently, a conductive water repellent material ink is sprayed onto the outer surface of the substrate at a conductive water repellent layer spraying portion 87 to form a conductive water repellent layer thereon. The substrate 81 with the conductive water repellent material ink sprayed thereon is heated at a heating chamber 88, whereby the ink is dried and cured to form a conductive water repellent layer on the surface of the substrate. Finally, the substrate 81 with the conductive water repellent layer is wound on the take-up roller member 83.

Using the thus-produced gas diffusion layer substrate, a unit cell for polymer fuel cell was produced. The following describes the process for producing an MEA.

A catalytic reaction layer ink for cathode was prepared by dispersing a catalytic powder comprising Ketjen Black EC (manufactured by AKZO Chemie, Netherlands) and particulate platinum carried thereon in an aqueous solution of a polymer electrolyte, and a catalytic reaction layer ink for anode was prepared by dispersing a catalytic powder comprising Ketjen Black EC and particulate platinum and ruthenium both carried thereon in an aqueous solution of a polymer electrolyte. Different films were coated by them respectively, which were then dried and cut into 5 cm square pieces. The thus-obtained anode and cathode catalytic reaction layers were respectively transferred to the faces of the polymer electrolyte membrane (manufactured by E.I. Du Pont de Numours & Co. Inc.), and the films were peeled to give a polymer electrolyte membrane with catalytic reaction layers.

A gas diffusion layer substrate was cut into 5.2 mm square pieces so that it would completely cover the catalytic reaction layer when combined to form an MEA. Then, the two gas diffusion layers were laminated onto both faces of the polymer electrolyte membrane with the catalytic reaction layers such that the gas diffusion layer covered the catalytic reaction layer. On the periphery thereof was aligned and disposed a gasket analogous to the one in Example 1. The thus-obtained stack comprising them was hot-pressed at 100° C. for 3 minutes to give an MEA.

Figure 9:
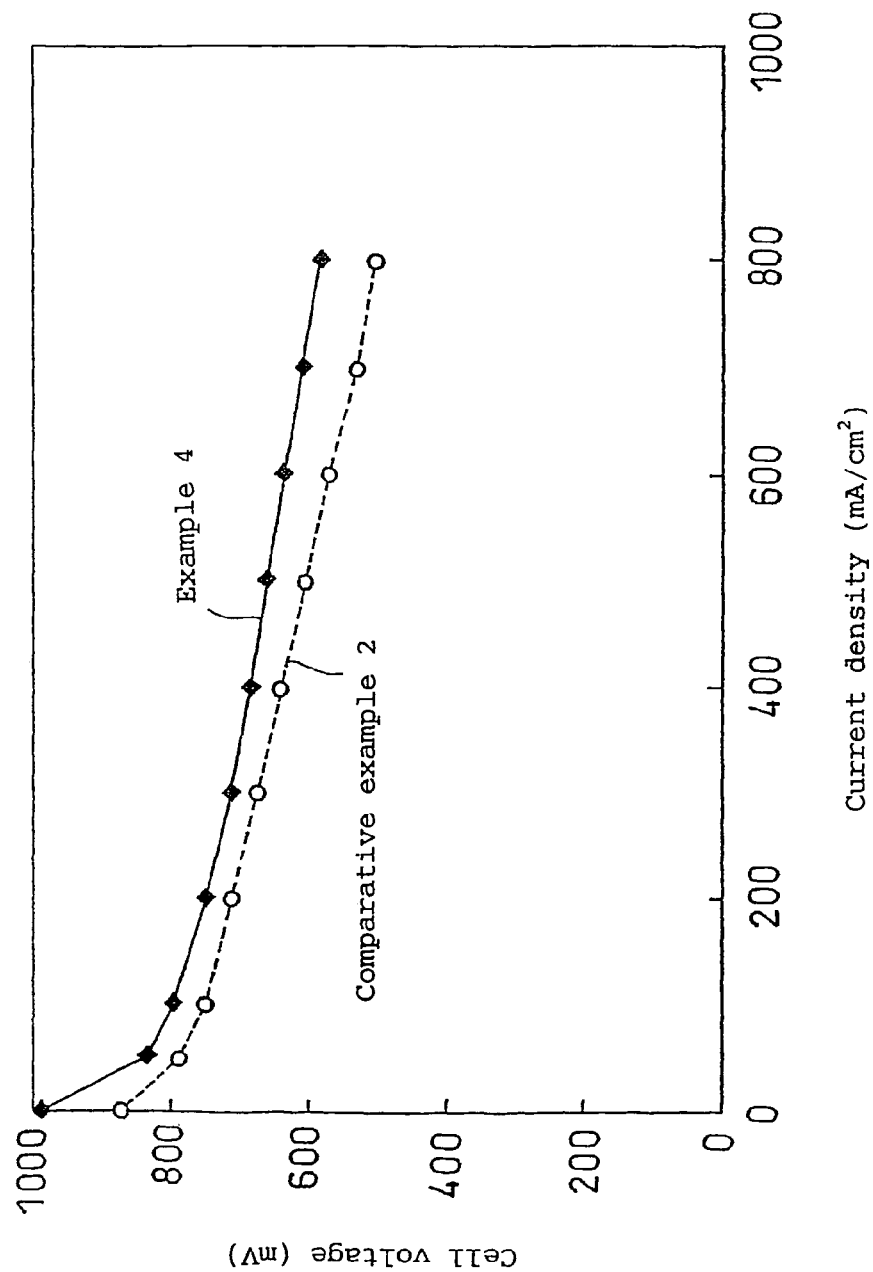
FIG. 9 is a characteristic graph showing the relation between the current density and the cell voltage of a polymer electrolyte fuel cell in Example and Comparative example of the present invention.

The MEA was incorporated into a test fuel cell in the same manner as in Example 1 to give a polymer electrolyte fuel cell (unit cell) to be used as the first embodiment of the present example. Hydrogen was fed into the anode side of the test fuel cell and air was fed into the cathode side of the same, whereby current density-voltage characteristics were measured. The conditions for the test were as follows. The dew point at the anode side was set at 70° C., the hydrogen utilization rate was set at 70%, the dew point at the cathode side was set at 70° C., the air utilization rate was set at 40% and the cell temperature was set at 75° C. The open cell voltage under such conditions was 982 mV. The measurement results of the current density-voltage characteristics were plotted to from a characteristic curve shown in FIG. 9 which is referred to as "Example 4".

Figure 10:
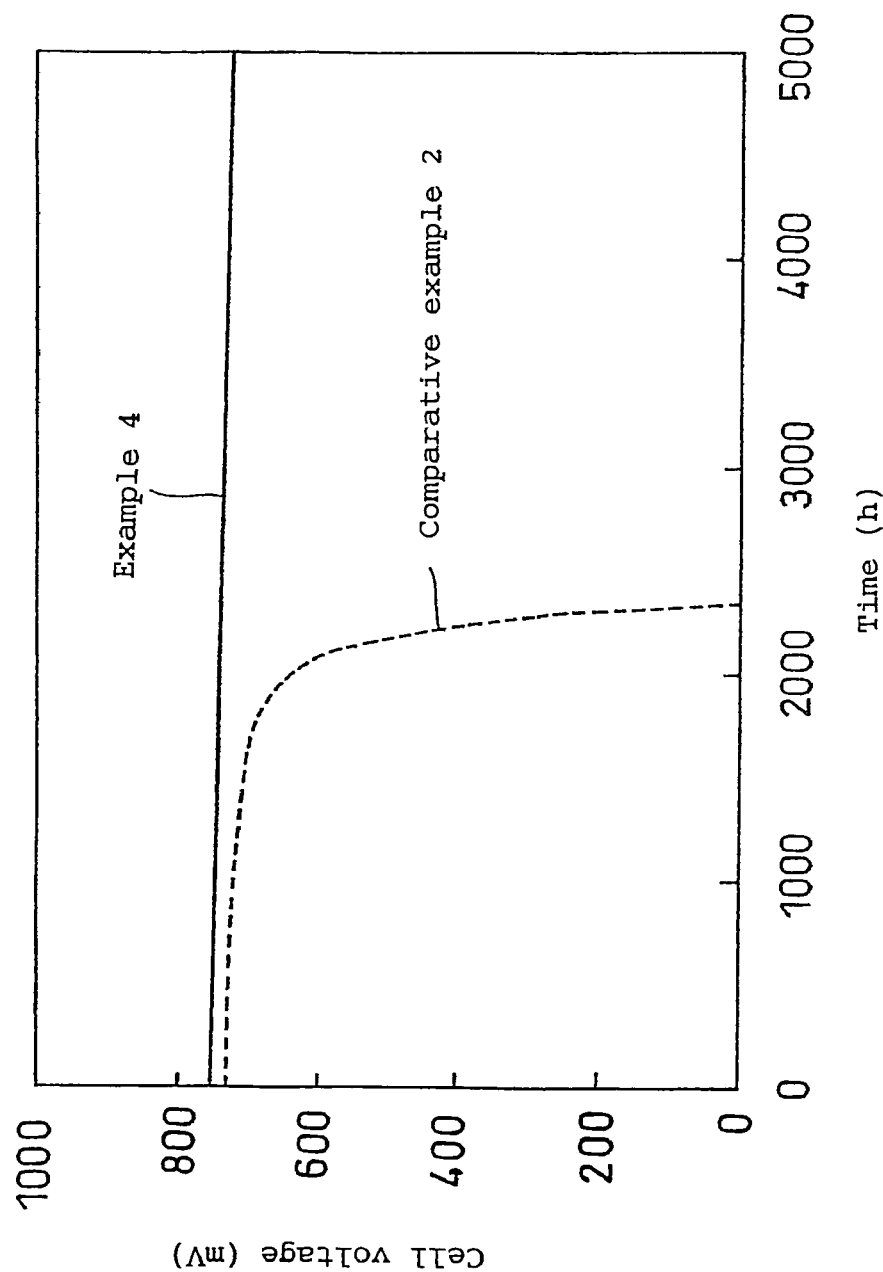
FIG. 10 is a characteristic graph showing the relation between the elapsed time and the cell voltage in a continuous operation test of a polymer electrolyte fuel cell in Example and Comparative example of the present invention.

The test fuel cell of Example 4 was also put through a continuous operation test at a current density of 0.3 A/cm$^2$ for 5000 hours. The cell voltage at the beginning of the operation was 752 mV, and the cell voltage after 5000 hours was 742 mV. The results of the continuous operation test was plotted to from a characteristic curve shown in FIG. 10 which is referred to as "Example 4".

As the second embodiment of the process of Example 4 shown in FIG. 8, a laser radiation portion was positioned in the place of the burner portion 84, instead of the burner portion 84 for flame radiation, in the process of FIG. 8 so that the fuzz would be removed by the laser radiation. Except that the layer radiation portion was placed instead of the burner portion, a polymer electrolyte fuel cell (unit cell) to be used as the test fuel cell of the second embodiment of Example 4 was produced through the same process and in the same manner as in the above-described first embodiment. The open cell voltage, the current density-voltage characteristics and the continuous operation characteristic of the test fuel cell of the second embodiment was measured under the same conditions and in the same manner as those of the test fuel cell of the first embodiment was measured. The obtained measurement results of the open cell voltage, the current density-voltage characteristics and the continuous operation characteristic were almost the same as those of the above test fuel cell of the first embodiment.

Further, as the third embodiment of the process of Example 4 shown in FIG. 8, an electric radiation heater portion was positioned in the place of the burner portion 84, instead of the burner portion 84 for flame radiation, in the process of FIG. 8 so that the fuzz would be removed by the electric heating radiation. Except that the electric radiation heater portion was placed instead of the burner portion, a polymer electrolyte fuel cell (unit cell) to be used as the test fuel cell of the third embodiment of Example 4 was produced through the same process and in the same manner as in the above-described first embodiment. The open cell voltage, the current density-voltage characteristics and the continuous operation characteristic of the test fuel cell of the third embodiment was measured under the same conditions and in the same manner as those of the test fuel cell of the first embodiment was measured. The obtained measurement results of the open cell voltage, the current density-voltage characteristics and the continuous operation characteristic were almost the same was those of the above test cell of the first embodiment.

COMPARATIVE EXAMPLE 2

For comparison to the test fuel cells in accordance with Example 4, a test fuel cell (unit cell) of Comparative example 2 was produced in the same manner as in Example 4, except that any of the burner portion, the laser radiation portion and the electric radiation heater portion represented by the numeral 84 was not disposed in the process shown in FIG. 8 so that the substrate 81 dispensed from the gas diffusion layer substrate dispensing roller member was directly immersed in the immersion bath 85 for water repellent treatment. The open cell voltage, the current density-voltage characteristics and the continuous operation characteristic were measured under the same conditions and in the same manner as those of the test fuel cell of Example 4 was measured.

From the results of the measurement, the open cell voltage was 870 mV, which was much lower than that of the test fuel cell of Example 4. The measurement results of the current density-voltage characteristics and the continuous operation test were respectively plotted to form characteristic curves in FIGS. 9 and 10, both of which are referred to as "Comparative example 2".

As is clear from these characteristic curves, in terms of current density-voltage characteristics, the test fuel cell in accordance with Comparative example 2 had a lower cell voltage than that in accordance with Example 4. In terms of continuous operation characteristic, the cell voltage at the beginning of the operation was 728 mV; however, unlike that of Example 4, the cell voltage started to decline rapidly at the time of 1750 hours after the start of the operation, and soon after it became impossible to continue the operation.

The above comparative tests prove that it is preferred to previously smooth the rough surface of the gas diffusion layer substrate made of carbon fiber by heating the surface thereof before the gas diffusion layer substrate is placed on the polymer electrolyte membrane when the polymer electrolyte membrane is interposed between a pair of electrodes to form an MEA. To be more specific, it is shown that the pre-smoothing treatment oxidizes the fuzz of carbon fiber and the random asperities to remove them without damaging the fiber skeleton of the carbon fiber, whereby the micro short-circuit like the above can be prevented.

Examples 1 to 4 and Comparative examples 1 and 2 described above used a warp thread comprising two thin fiber bundles and a weft thread comprising one or two thin fiber bundles. However, it was confirmed in other experiments that, even when one bundle or an arbitrary number of bundles are used as the warp or weft thread, an effect analogous to that of the above embodiments and the above examples were obtained if the requirements of the present embodiment are satisfied.

Examples 1 to 4 and Comparative examples 1 and 2 also used a plain weave fabric as the gas diffusion layer substrate. However, it was confirmed, in other experiments which were performed in the same manner except that a twill weave fabric or a sateen was used instead of a plain weave fabric, that an effect analogous to that of the above embodiments and the above examples can be obtained.

It is noted that, although the above examples used hydrogen and air as an example of the fuels, it was also confirmed that a similar effect can be obtained even when a reformed hydrogen containing impurities such as carbonic acid gas, nitrogen or carbon monoxide is used, or even when a liquid fuel such as methanol, ethanol or dimethyl ether, or their mixture is used instead of hydrogen. It was also confirmed that the liquid fuel may be vaporized previously and the vapor thereof can be fed.

Moreover, the structure of the fuel cell of the present invention and the method for producing the fuel cell of the present invention are not limited to the above, and the effect was also obtained even when several different structures were used or several different production methods were performed if the requirements of the first, second or third aspect of the present invention were satisfied.

INDUSTRIAL APPLICABILITY

A highly reliable fuel cell having high discharge performance in which a micro short-circuit is prevented can be realized by using a substrate, an MEA, a fuel cell in accordance with the present invention or the production method thereof. Furthermore, the MEA of the present invention is applicable to generators and purifiers of a gas such as oxygen, ozone or hydrogen, and various gas sensors such as an oxygen sensor and an alcohol sensor.

The invention claimed is:

1. An electrolyte membrane-electrode assembly comprising a hydrogen ion conductive polymer electrolyte membrane and a pair of electrodes sandwiching the polymer electrolyte membrane therebetween, each said electrode comprising a catalyst layer and a gas diffusion layer attached to said polymer electrolyte membrane, wherein:

said gas diffusion layer comprises a fabric having a warp thread and a weft thread which are made of carbon fiber, and the distance X between adjacent intersections where said warp and weft threads cross each other and the thickness Y of said fabric satisfy the equation: $1.4 \leq X/Y \leq 3.5$, the height A and the width B of said warp thread, and the height C and the width D of said weft thread respectively satisfy $0.2 \leq A/B \leq 0.4$ and $0.1 \leq C/D \leq 0.4$.

2. The electrolyte membrane-electrode assembly in accordance with claim 1, wherein the height C and the width D of said weft thread disposed vertically to said consecutive warp thread satisfy $0.1 \leq C/D \leq 0.3$.

3. The electrolyte membrane-electrode assembly in accordance with claim 1, wherein said substrate has a water repellent layer comprising a carbon fine powder and a water repellent resin on the surface of said substrate on said catalyst layer side, and said water repellent layer has a thickness of 1 to 50 μm.

4. The electrolyte membrane-electrode assembly in accordance with claim 1, wherein said polymer electrolyte membrane has a thickness of 9 to 50 μm.

5. The electrolyte membrane-electrode assembly in accordance with claim 1, wherein said catalyst layer has a thickness of 1 to 30 μm.

6. A polymer electrolyte fuel cell characterized in that said fuel cell comprising:

(a) an electrolyte membrane-electrode assembly comprising a hydrogen ion conductive polymer electrolyte membrane and a pair of electrodes sandwiching said polymer electrolyte membrane therebetween, said electrode comprising a catalyst layer attached to the polymer electrolyte membrane and a gas diffusion layer, said gas diffusion layer comprising a fabric comprising a warp thread and a weft thread which are made of carbon fiber, the distance X between adjacent intersections where said warp and weft threads cross each other and the thickness Y of said fabric satisfying the equation: $1.4 \leq X/Y \leq 3.5$; and (b) a pair of conductive separator plates having a gas channel on the face in contact with said gas diffusion layer of said electrolyte membrane-electrode assembly and sandwiching said electrolyte membrane-electrode assembly such that said separator plate is attached to said gas diffusion layer of the electrolyte membrane-electrode assembly, a clamping pressure of 1 to 20 $kgf/cm^2$ being applied per the area where each of said electrodes and each of said conductive separator plates are in contact with each other, wherein the height A and the width B of said warp thread, and the height C and the width D of said weft thread respectively satisfy $0.2 \leq A/B \leq 0.4$ and $0.1 \leq C/D \leq 0.4$.

* * * * *